United States Patent
Tsuda et al.

(10) Patent No.: US 11,294,647 B1
(45) Date of Patent: Apr. 5, 2022

(54) SUPPORT APPARATUS AND DESIGN SUPPORT METHOD

(71) Applicant: RENESAS ELECTRONICS CORPORATION, Tokyo (JP)

(72) Inventors: Tetsuji Tsuda, Tokyo (JP); Saika Arai, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 17/097,850

(22) Filed: Nov. 13, 2020

(51) Int. Cl.
G06F 8/41 (2018.01)
G06F 8/35 (2018.01)

(52) U.S. Cl.
CPC . G06F 8/35 (2013.01); G06F 8/41 (2013.01)

(58) Field of Classification Search
CPC .................. G06F 8/35; G06F 8/41; G06F 8/54
See application file for complete search history.

(56) References Cited

U.S. PATENT DOCUMENTS

| | | | | |
|---|---|---|---|---|
| 10,474,566 | B2* | 11/2019 | Indurthivenkata | G06F 8/35 |
| 2014/0380269 | A1* | 12/2014 | Conrad | G06F 11/3604 717/104 |
| 2018/0137022 | A1 | 5/2018 | Funabashi et al. | |
| 2021/0124563 | A1* | 4/2021 | Moors | G06F 8/35 |

FOREIGN PATENT DOCUMENTS

JP 2018-081400 A 5/2018

OTHER PUBLICATIONS

Thomas Weigert et al., Automated Code Generation for Industrial-Strength Systems, IEEE, 2008, retrieved online on Jan. 28, 2022, pp. 464-472. Retrieved from the Internet: <URL: https://ieeexplore.IEEE.org/stamp/stamp.jsp?tp=&arnumber=4591598>. (Year: 2008).*

* cited by examiner

Primary Examiner — Hanh Thi-Minh Bui
(74) Attorney, Agent, or Firm — McDermott Will & Emery LLP

(57) ABSTRACT

A storage device stores a source code and a model created by referencing a source code. A processor generates a terminal generation setting file in which a terminal of a code block is written, by searching a terminal block included in the model read from the storage device and defining the terminal of the code block based on the terminal block obtained from a search result of the terminal block. Further, the processor writes, in the code block, a terminal linking code indicating a correspondence relationship between the terminal written in the terminal generation setting file and the source code. Furthermore, the processor compiles, using the terminal generation setting file, the code block in which the terminal linking code is written into a format executable in the model execution environment.

11 Claims, 21 Drawing Sheets

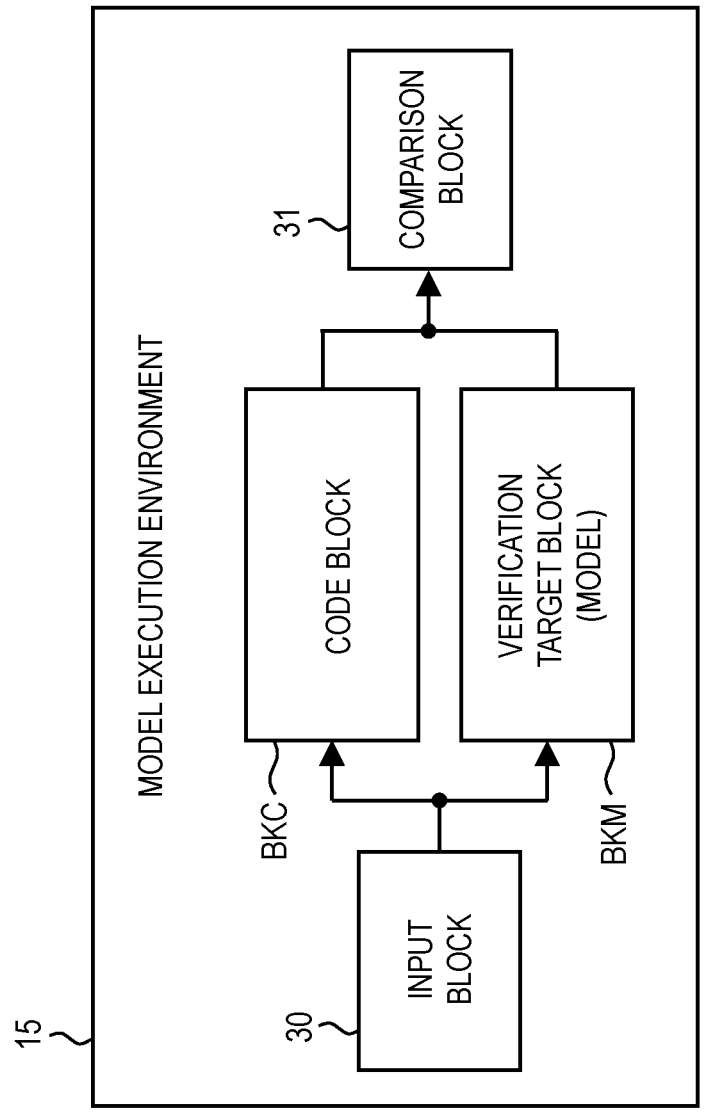

SUPPORT APPARATUS AND DESIGN SUPPORT METHOD

BACKGROUND

The present disclosure relates to a design support apparatus and a design support method.

There is a disclosed technique listed below.
[Patent Document 1] Japanese Unexamined Patent Application Publication No. 2018-81400

As an apparatus used in the model-based development, a virtual development environment apparatus as shown in Patent Document 1 is known. The virtual development environment apparatus includes an interface unit for enabling control of intentional fault injections, intentional response delays, and the like into a device model from the system test program.

SUMMARY

Model-based development is known as a development method of various embedded systems representative of automobile applications and the like. The model-based development is a technique of previously creating a model such as a system model and a device model, and operating the model in a model execution environment, thereby advancing development of a target indicated by the model based on the model.

Here, in the model, functions, configurations, and operations of a target such as a system or a device are virtually implemented on software using a Computer Aided Engineering (CAE) tool. The model execution environment is an environment constructed by a CAE tool. CAE tools typically include MATLAB®, Simulink® and the like.

With such model-based development, for example, various problems that have been extracted by testing actual systems and devices in the past can be extracted without waiting for completion of the actual systems and devices, and can be fed back to the design of the systems and devices at an early stage.

On the other hand, for example, a device manufacturer has many source codes that can be mounted on a device such as a microcontroller as a design asset. Here, for example, a case is assumed in which the source code included in the design asset is effectively utilized and a new system including a device on which the source code is mounted as a component is developed by model-based development.

In this case, there may be a situation where the source code exists, but there is no system model that reflects the source code. For this reason, for example, a user such as a designer needs to create a new system model and verify that the created system model accurately reflects the source code. However, this verification operation may cause a great workload such as labor and work time.

Other objects and new features will be apparent from the description of this specification and the accompanying drawings.

Therefore, the design support apparatus according to one embodiment is an apparatus that supports a generation of a code block to verify a model created by referencing a source code, and includes a processor and a storage device. The model operates in a model execution environment in model-based development. The source code is registered in the code block. The storage device stores the source code and the model. The processor generates a terminal generation setting file in which a terminal of the code block is written, by searching a terminal block included in the model read from the storage device and defining the terminal of the code block based on the terminal block obtained from a search result of the terminal block. Further, the processor writes, in the code block, a terminal linking code indicating a correspondence relationship between the terminal written in the terminal generation setting file and the source code. Furthermore, the processor compiles, using the terminal generation setting file, the code block in which the terminal linking code is written into a format executable in the model execution environment.

The design support apparatus according to one embodiment can be used to reduce the workload of the user.

BRIEF DESCRIPTION OF THE DRAWINGS

FIG. 5 is a diagram for explaining an example of a verification method used in the design support apparatus according to the embodiment of the present disclosure.

DETAILED DESCRIPTION

Figure 1:
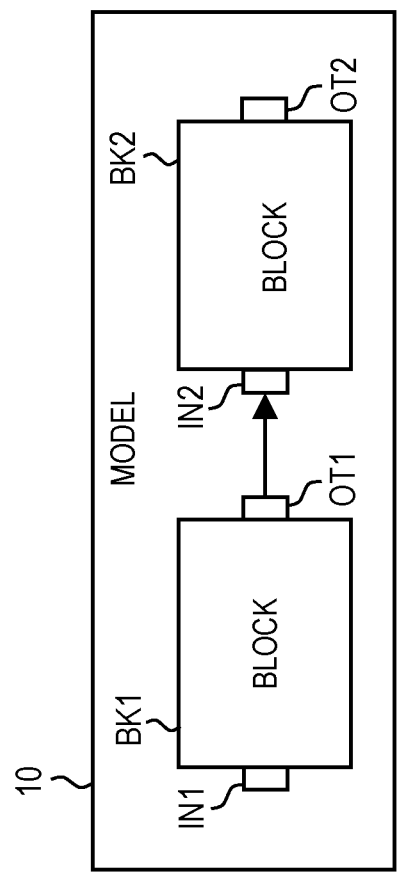
FIG. 1 is a diagram for explaining a model used in a design support apparatus according to an embodiment of the present disclosure.

In the following embodiments, when required for convenience, the description will be made by dividing into a plurality of sections or embodiments, but except when specifically stated, they are not independent of each other, and one is related to the modified example, detail, supplementary description, or the like of part or all of the other. In the following embodiments, the number of elements, etc. (including the number of elements, numerical values, quantities, ranges, etc.) is not limited to the specific number, but may be not less than or equal to the specific number, except for cases where the number is specifically indicated and is clearly limited to the specific number in principle. Furthermore, in the following embodiments, it is needless to say that the constituent elements (including element steps and the like) are not necessarily essential except in the case where they are specifically specified and the case where they are considered to be obviously essential in principle. Similarly, in the following embodiments, when referring to the shapes, positional relationships, and the like of components and the like, it is assumed that the shapes and the like are substantially approximate to or similar to the shapes and the like, except for the case in which they are specifically specified and the case in which they are considered to be obvious in principle, and the like. The same applies to the above numerical values and ranges.

Hereinafter, embodiments will be described in detail with reference to the drawings. In all the drawings for explaining the embodiments, members having the same functions are denoted by the same reference numerals, and repetitive descriptions thereof are omitted. In the following embodiments, descriptions of the same or similar parts will not be repeated in principle except when particularly necessary.

Various Assumptions for Design Support Apparatus

FIG. 1 is a diagram for explaining a model used in a design support apparatus according to an embodiment of the present disclosure. A model 10 is represented by a block diagram as shown in FIG. 1 on a CAE tool indicated by MATLAB, Simulink, or the like. In this case, the block diagram is shown in which a block BK1 having an input terminal IN1 and an output terminal OT1, and a block BK2 having an input terminal IN2 and an output terminal OT2 are connected.

In addition, the block is usually hierarchically constructed such that a plurality of lower-level blocks is included in an upper-level block. In this viewpoint, the model 10 can also be regarded as a single upper-level block. As a specific example, it is assumed that a microcontroller functions as a motor controller by, for example, implementing a source code in the microcontroller. The motor controller includes a Proportional Integral (PI) controller for speed control, and a PI controller for torque control. Furthermore, each PI controller includes a proportional calculator, an integral calculator, or the like.

In this case, the model 10, which is also the upper-level block, for example, indicates the function, configuration, operation of the motor controller. The middle-level block included in the upper-level block indicates the function, configuration, and operation of the PI controller or the like. Further, the lower-level block included in the middle-level block indicates the function, configuration, and operation of the integral calculator or the like. In the block diagram, the terminal of each block is also one of the blocks, for example, the input terminal IN1 is an input terminal block, the output terminal OT1 is an output terminal block.

Figure 2:
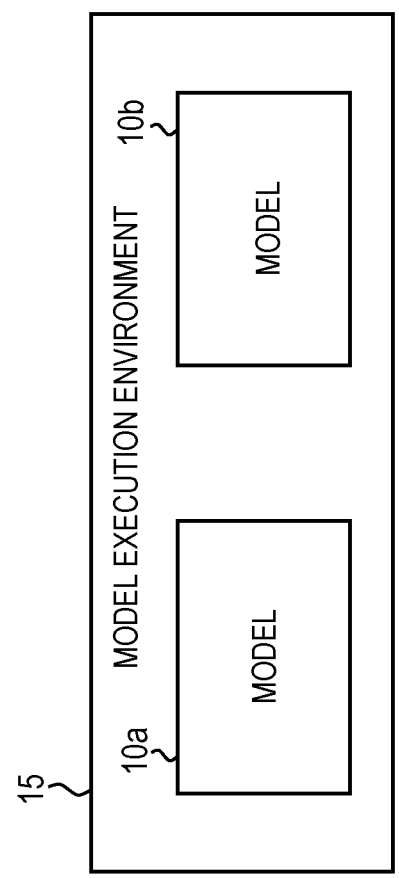
FIG. 2 is a diagram for explaining a model execution environment used in the design support apparatus according to the embodiment of the present disclosure.

FIG. 2 is a diagram for explaining a model execution environment used in the design support apparatus according to the embodiment of the present disclosure. A model execution environment 15 is an environment constructed by a processor executing a CAE tool, and is an environment for generating and operating one or more models 10a and 10b as shown in FIG. 2. The model execution environment 15 can also be referred to as a model generation function and a simulation function on the CAE tool.

Figure 3:
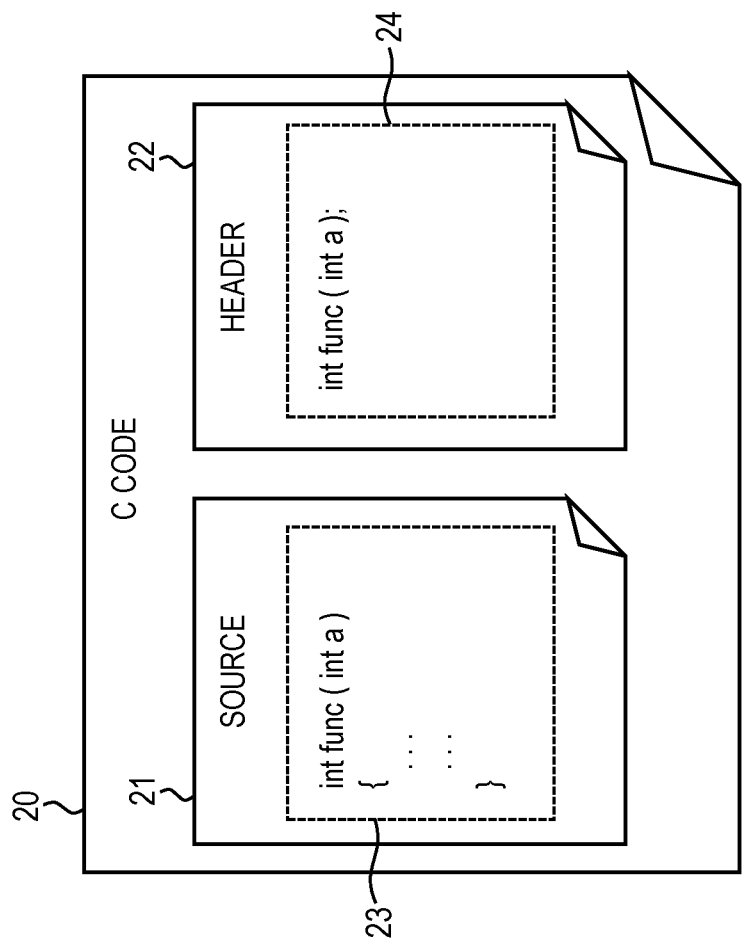
FIG. 3 a diagram showing an example of a configuration of a C code used in the design support apparatus according to the embodiment of the present disclosure.
Figure 4:
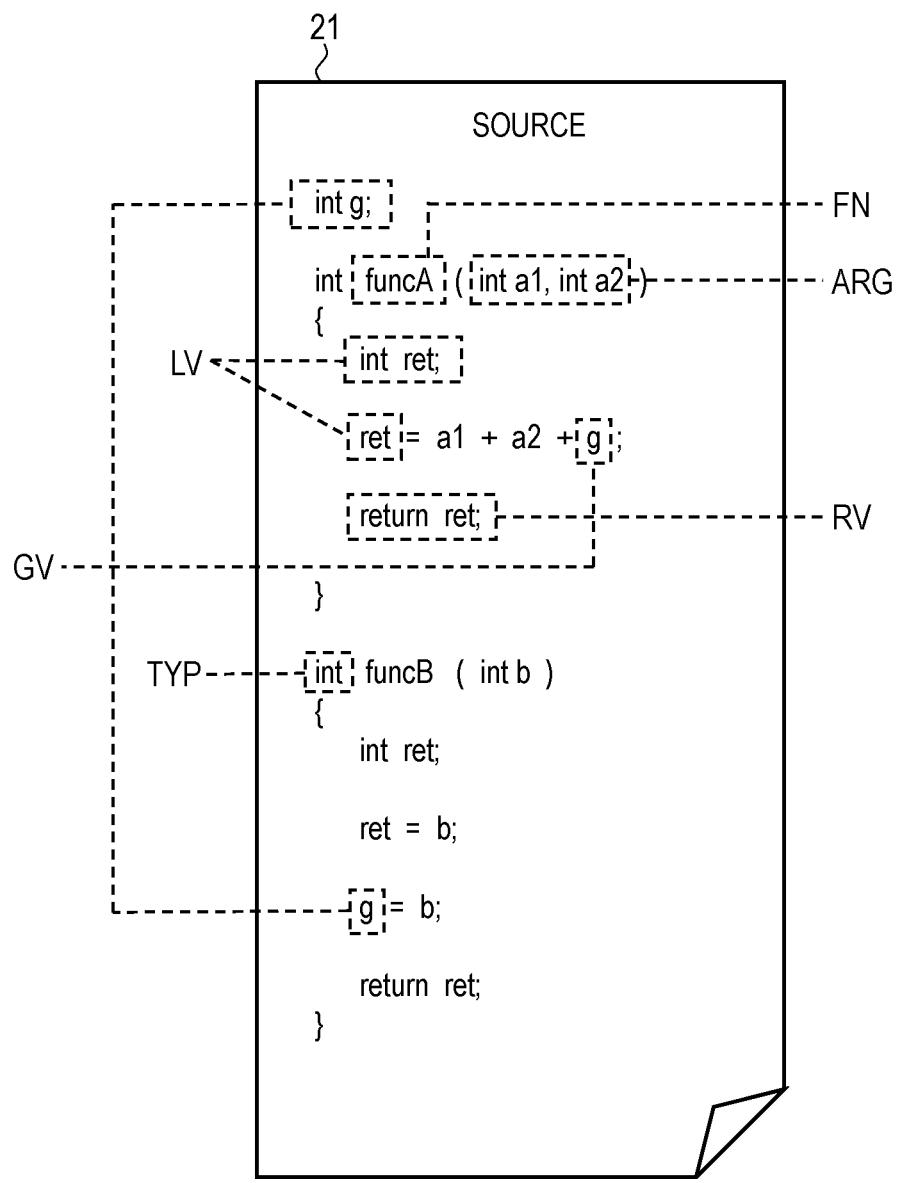
FIG. 4 is a diagram showing an example of the description content of a source in FIG. 3.

FIG. 3 is a diagram showing an example of a configuration of a C code used in the design support apparatus according to the embodiment of the present disclosure. FIG. 4 is a diagram showing an example of the description content of the source in FIG. 3. In this specification, C code, which is the source code described in C language, is used as an example of the source code. However, the source code is not limited to C code, and may be described in other programming languages. The C code 20 is configured by a source 21 and a header 22, as shown in FIG. 3. The source 21 contains a definition 23 of the function ("func" in this example) and the header 22 contains a declaration 24 of the function.

In the source 21 of FIG. 4, a function whose function name FN is "funcA" and a function whose function name FN is "funcB" are defined. The source 21 also includes parameters such as a local variable LV, an argument ARG, a return value RV, and a global variable GV. The local variable LV is a parameter that can only be used inside a function. The argument ARG, return value RV, and global variable GV are parameters that can be used between functions. The argument ARG is the input value to the function, the return value RV is the output value from the function, and the global variable GV is the input and output values of the function. The parameter has a type name TYP which distinguishes bit width, signed/unsigned, integer/decimal.

Considering the function of "funcA" in FIG. 4 as an example, the function calculates, as inputs of "a1" and "a2", which are arguments ARG, a value of "ret" which is the local variable LV by adding these arguments to "g", which is the global variable GV. The function outputs the calculated value of "ret" as a return value RV.

FIG. 5 is a diagram for explaining an example of a verification method used in the design support apparatus according to the embodiment of the present disclosure. As described above, in order to utilize the design asset of the C code 20, a user such as a designer may refer to the C code 20 and create the model 10 reflecting each parameter of the C code 20 using the CAE tool. At this time, the user needs to verify that the created model 10 accurately reflects the C code 20. FIG. 5 shows the verification method in this case.

In FIG. 5, the user creates a model reflecting the C code 20 by using the model execution environment 15 which is the CAE tool. In this specification, a model created by a user with reference to and reflecting the C code 20 in this manner is referred to as a verification target block BKM. In addition, the user creates a block in which the C code 20, which is a reflection source of the verification target block BKM, is registered by using the model execution environment 15. In this specification, the block in which the C code 20 is registered in this manner is referred to as a code block BKC. Note that the verification target block BKM is also a model as described above.

Specifically, in the CAE tool such as MATLAB and Simulink, any C code 20 can be generally registered, and a block such as an S-function block that can execute the registered C code 20 is provided in advance. The user creates the code block BKC using the blocks on the CAE tool.

In addition, the user uses the model execution environment 15 to create an input block 30 for inputting the same data to the created code block BKC and the verification target block BKM, and a comparison block 31 for comparing the outputs from the two blocks in accordance therewith. Then, the user compiles the four blocks thus created into a format executable in the model execution environment 15, and verifies the identity between the code block BKC and the verification target block BKM by operating the blocks in the model execution environment 15.

That is, the user verifies that the verification target block BKM has been created accurately reflecting the C code 20 based on the comparison result of the comparison block 31. Specifically, the user confirms that the difference between the output of the code block BKC and the output of the verification target block BKM is zero, or less than or equal to the threshold value. The threshold value at this time is determined on the basis of a difference in the method of handling decimal points in the two blocks. This difference in the handling method may occur due to the specification of the CAE tool.

Generation Method of Code Block (Comparative Example)

Figure 6A:
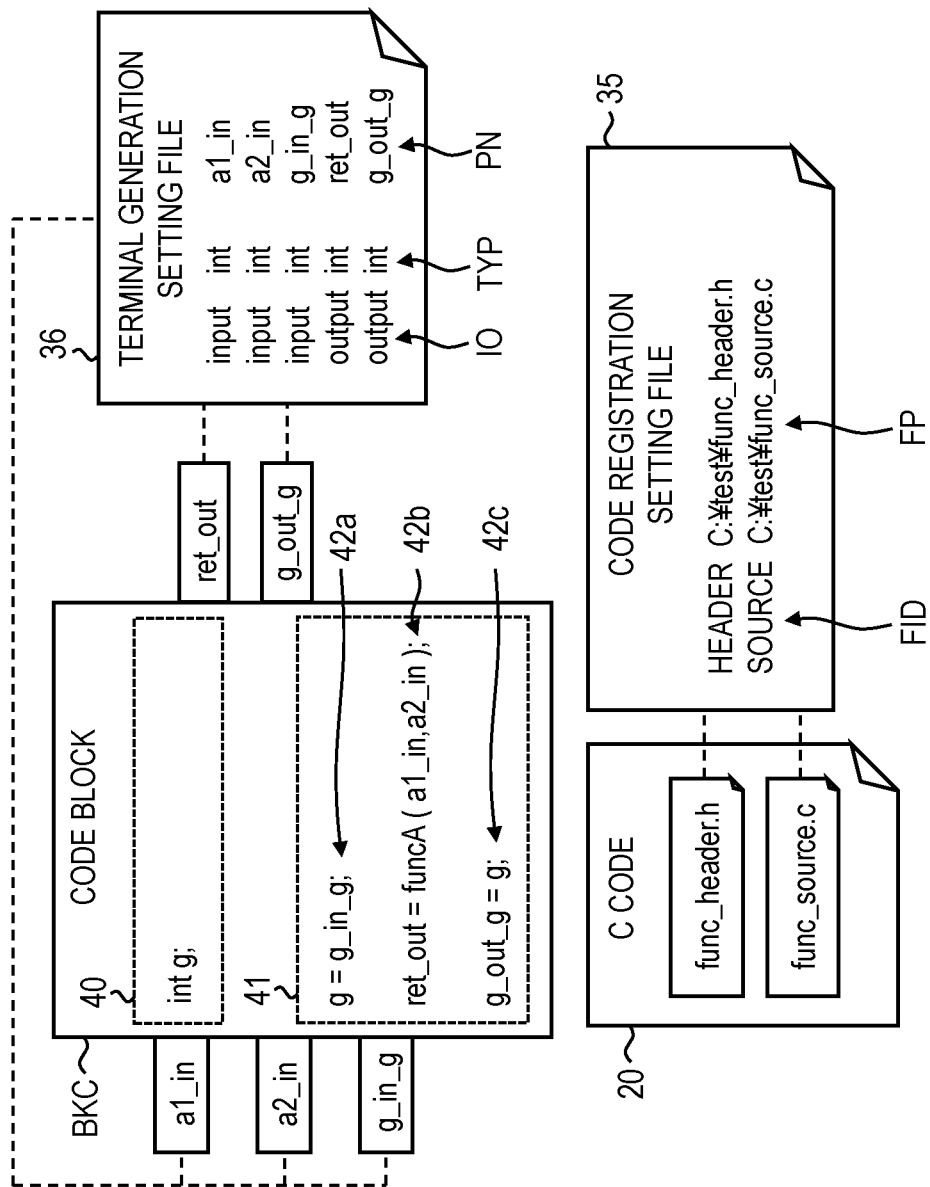
FIG. 6A is a diagram for explaining an example of a generation method of a code block in FIG. 5 as a comparative example.
Figure 6B:
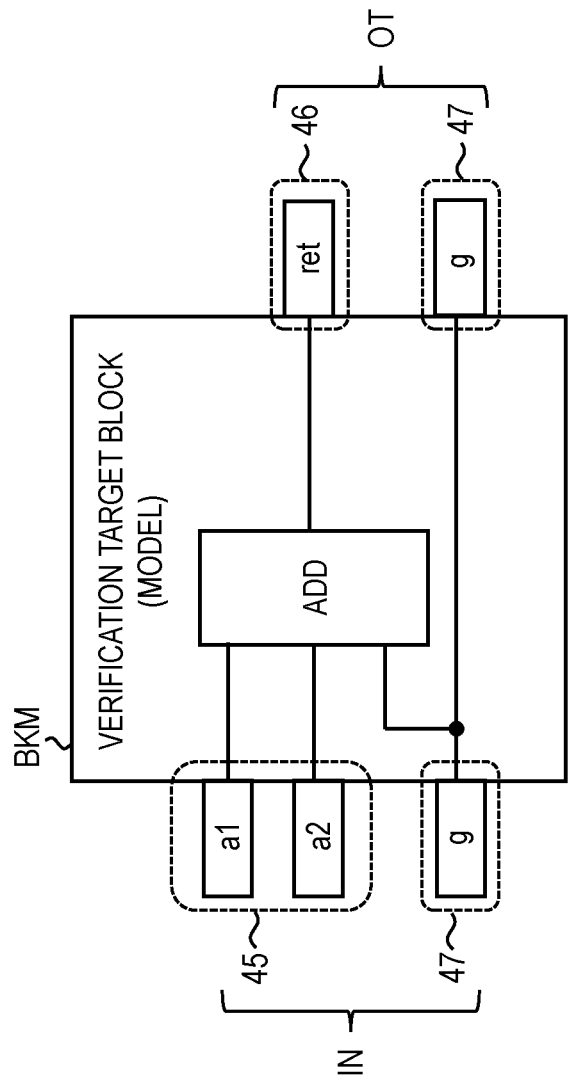
FIG. 6B is a schematic diagram showing an example of a configuration of a verification target block in FIG. 5.

FIG. 6A is a diagram for explaining an example of a generation method of the code block in FIG. 5 as a comparative example. FIG. 6B is a schematic diagram showing an example of a configuration of the verification target block in FIG. 5. The BKM to be verified shown in FIG. 6B is created, for example, reflecting the function of "funcA" shown in FIG. 4. The verification target block BKM has three input terminals IN, two output terminals OT, and an addition block ADD. In the block diagram, the input terminal IN is an input terminal block, the output terminal OT is an output terminal block.

The block type of two input terminals IN whose argument names are "a1" and "a2" is set to an argument block 45 on the CAE tool. The block type of the input terminal IN whose variable name is "g" is set in a global variable block 47. In this specification, the input terminal IN set in the global variable block 47 is referred to as a global variable input terminal as distinguished from the input terminal IN set in the argument block 45.

The block type of the output terminal OT whose return value name is "ret" is set to a return value block 46. The block type of the output terminal OT whose variable name is "g" is set in a global variable block 47. In this specification, the output terminal OT set in the global variable block 47 is referred to as a global variable output terminal as distinguished from the output terminal OT set in the return value block 46. The addition block ADD adds the values of "a1" and "a2" at the input terminals and the value of "g" at the global variable input terminal, and outputs the addition result as the value of "ret" at the output terminal.

When verifying such a verification target block BKM, the user registers the C code 20, which is the reflection source of the verification target block BKM, in the code block BKC. In this example, the function of "funcA" shown in FIG. 4 is registered as the C code 20. At this time, the user performs the first to fourth operations in FIG. 6A. As the first operation, the user creates a code registration setting file 35 describing a file path of the C code 20 in order to register the function of "funcA" which is the C code 20 in the code block BKC. The description items in the code registration setting file 35 are a file identifier FID for identifying the source 21 and the header 22, and a file path FP of the source 21 and the header 22.

Next, as the second operation, the user creates a terminal generation setting file 36 describing the terminals of the code block BKC, in order to generate the input terminal reflecting the argument ARG of the C code 20, the output terminal reflecting the return value RV, and the input and output terminals reflecting the global variable GV. The description items in the terminal generation setting file 36 are an input/output attribute IC, a type name TYP, and a terminal name PN.

By the first and second operations, the C code 20 is registered in the code block BKC, and necessary terminals can be generated in the code block BKC. However, at this stage, each terminal is not linked to the C code 20. Therefore, as the third operation, the user describes a terminal linking code 41 indicating the correspondence relationship between the terminal described in the terminal generation setting file 36 and the C code 20 in the code block BKC in order to link each terminal and the C code 20. A declaration 40 of the global variable is also described in the code block BKC.

In the example of the terminal linking code 41 of FIG. 6A, three cords 42a, 42b, and 42c are described. The code 42a indicates that the value of the global variable input terminal "g_in_g" described in the terminal generation setting file 36 is substituted into the global variable "g" of the functions of "funcA" of the C code 20. The code 42b indicates that the values of the input terminals "a1_in" and "a2_in" described in the terminal generation setting file 36 are substituted into the arguments of the function of "funcA", and that the return value of the function is substituted into the value of the output terminal "ret_out" described in the terminal generation setting file 36. The code 42c indicates that the global variable "g" is substituted into the value of the output terminal "g_out_g" described in the terminal generation setting file 36.

Next, as the fourth operation, the user compiles the code block BKC in which the terminal linking code 41 is described into the format executable in the model execution environment 15 using the code registration setting file 35 and the terminal generation setting file 36. As a result, as shown in FIG. 5, the code block BKC operable in the model execution environment 15 is completed.

However, as the comparative example, in the generation method as described in FIG. 6A, the user needs to manually create all of the code registration setting file 35, the terminal generation setting file 36, and the terminal linking code 41. As a result, as the first problem, there is a possibility that the user's workload such as labor and work time increases. In particular, in the second and third operations described above, the user usually needs to perform the operations while analyzing the description of the C code 20 in detail. In this case, the C code 20 may have a variety of description formats in the same code, where the comment and the line feed insertion point are not unique. Therefore, as the C code 20 becomes longer and the description of the C code 20 becomes more complicated, the workload of the user may increase.

As the second problem, there is a high possibility of a description error associated with the generation of the code registration setting file 35, the terminal generation setting file 36, and the terminal linking code 41. When such a description error occurs, the code block BKC which originally should function as the expected value does not function as the expected value. The third problem is that the consistency between the terminals of the verification target block BKM and the parameters of the C code 20 cannot be verified. The parameters of the C code 20 include, for example, the arguments ARG, return value RV, global variable GV, and the like. That is, since it is desirable that the verification target block BKM is created by accurately reflecting the C code 20, it is desirable that the terminals of the verification target block BKM match the parameters of the C code 20.

Figure 7:
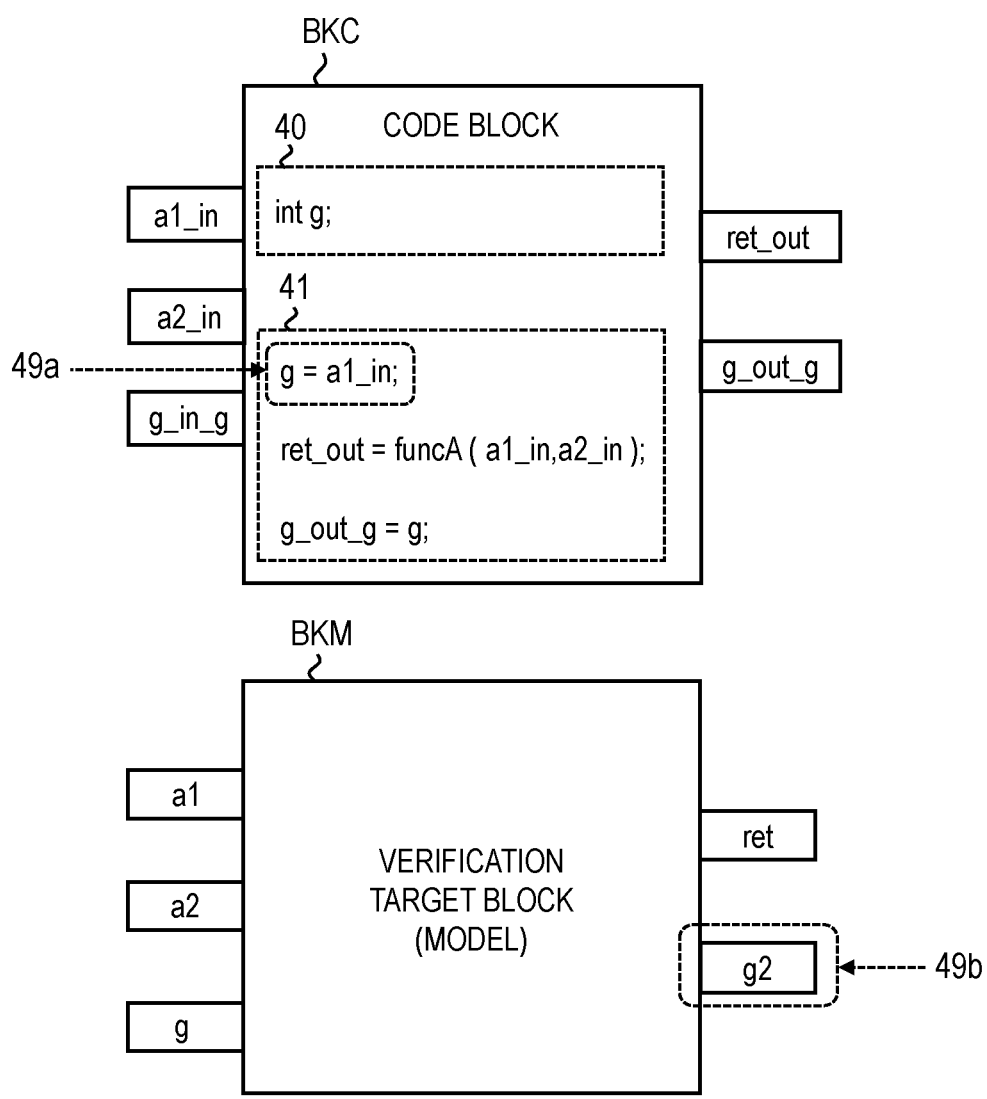
FIG. 7 is a diagram showing examples of description mistakes that may occur in FIGS. 6A and 6B.

FIG. 7 is a diagram showing examples of description errors that may occur in FIGS. 6A and 6B. A description error 49a in FIG. 7 is an example of the second problem described above. In the description error 49a, the user erroneously describes "g=a1_in" in the terminal linking code 41, instead of "g=g_in_g" as described in the code 42a of FIG. 6A. In this case, while the verification block BKM is created on the assumption that "g=g_in_g", the code block BKC executes the C code 20 on the assumption that "g=a1_in".

This causes a mismatch in the comparison block 31 of FIG. 5. However, at this time, it is difficult for the user to immediately identify the cause of the mismatch. Therefore, the user needs to investigate in detail whether or not the verification target block BKM is correctly created, and whether or not there is a description error in any of the code registration setting file 35, the terminal generation setting file 36, and the terminal linking code 41. This also results in an increased workload.

A description error 49b in FIG. 7 is an example of the third problem described above. With respect to the description error 49b, as shown in FIG. 4, a global variable "g" is defined on the C code 20. On the other hand, in the description error 49b, when the user creates the verification target block BKM by reflecting the C code 20, the user erroneously sets the terminal name of the global variable output terminal to "g2" instead of "g" as shown in the FIG. 6B. In this case, it cannot be said that the verification target block BKM is created by accurately reflecting the C code 20.

Configuration of Design Support Apparatus

Figure 8:
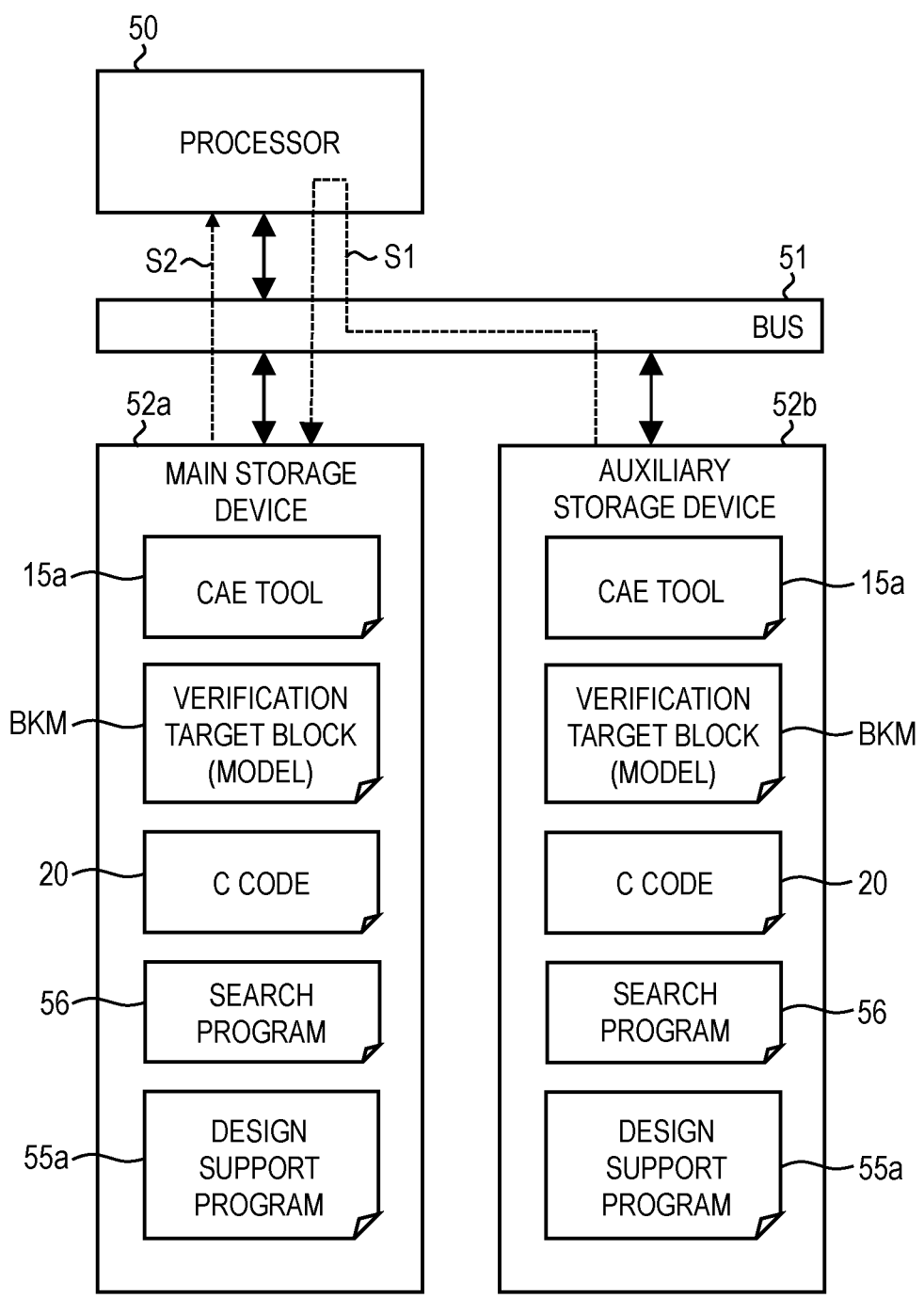
FIG. 8 is a schematic diagram showing an example of a hardware/software configuration for implementing the design support apparatus according to the embodiment of the present disclosure.

FIG. 8 is a schematic diagram showing an example of a hardware/software configuration for implementing the design support apparatus according to the embodiment of the present disclosure. FIG. 8 shows a processor 50, a main storage device 52a, an auxiliary storage device 52b, and a bus 51 connecting them to each other. The main storage device 52a is, for example, a Random Access Memory (RAM). The auxiliary storage device 52b is, for example, a Hard Disk Drive (HDD) or a Solid State Drive (SSD). In this specification, the main storage device 52a and the auxiliary storage device 52b are collectively referred to as a storage device.

The auxiliary storage device 52b stores a CAE tool 15a, the verification target block BKM, the C code 20, a search program 56, and a design support program 55a. The processor 50 copies the required programs and data from the auxiliary storage device 52b to the main storage device 52a via the bus 51. The processor 50 executes the programs stored in the main storage device 52a.

For example, the processor 50 executes the CAE tool 15a stored in the main storage device 52a to build the model execution environment 15 described above on the processor 50. By executing the search program 56 stored in the main storage device 52a, the processor 50 can acquire, for example, a file path FP of a predetermined file in the storage device. Further, the processor 50 executes the design support program 55a stored in the main storage device 52a so that the design support apparatus described later is implemented on the processor 50.

Figure 9:
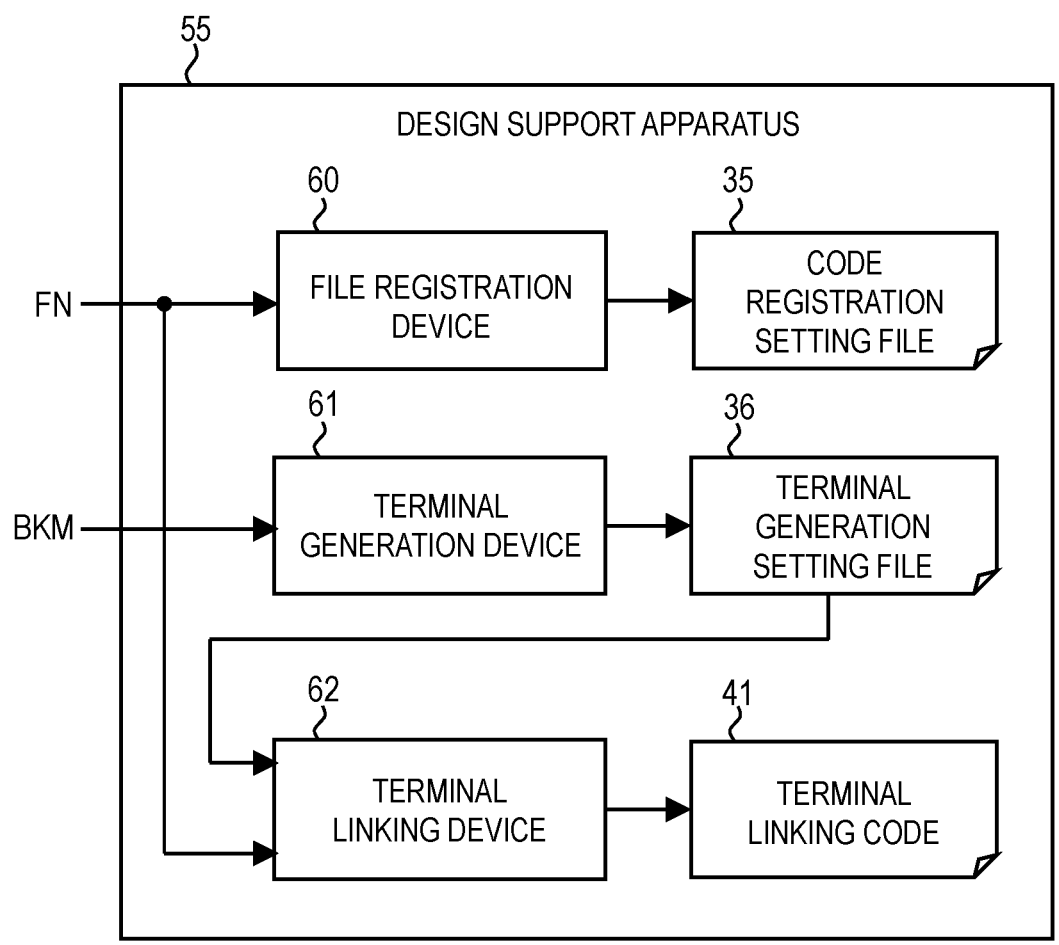
FIG. 9 is a block diagram showing an example of a configuration of a design support apparatus implemented using the configuration of FIG. 8.

FIG. 9 is a block diagram showing an example of a configuration of a design support apparatus implemented using the configuration of FIG. 8. The design support apparatus 55 shown in FIG. 9 is a device used in model-based development to support the generation of the code block BKC in which the C code 20 is registered. The design support apparatus 55 includes a file registration device 60, a terminal generation device 61, and a terminal linking device 62. The user inputs the function name FN and designates the created verification block BKM to the design support apparatus 55. The function name FN is a function name FN which is a reflection source of the created verification target block BKM and is "funcA" in the examples of FIG. 6A and FIG. 6B described above.

Based on the function name FN input by the user, the file registration device 60 searches the storage device for a file defining the function of the function name FN, and generates a code registration setting file 35 in which the file path FP obtained from the search result is written. The terminal generation device 61 reads the verification block BKM from the storage device based on the verification block BKM specified by the user. Then, the terminal generation device 61 searches for the terminal block included in the read-out verification target block BKM, and determines the terminal of the code block BKC based on the terminal block obtained from the search result, thereby generating a terminal generation setting file 36 in which the terminal of the code block BKC is written.

The terminal linking device 62 writes a terminal linking code 41 in the code block BKC based on the function name FN input by the user and the terminal generation setting file 36 generated by the terminal generation device 61. As shown in the FIG. 6A, the terminal linking code 41 indicates the correspondence between the terminals written in the terminal generation setting file 36, and the parameters or functions of the C code 20. The processor 50 of FIG. 8 compiles the code block BKC in which the terminal linking code 41 is written in this manner into a format executable in the model execution environment 15 using the code registration setting file 35 and the terminal generation setting file 36. At this time, a compiler included in the CAE tool 15a of FIG. 8 is used.

In the examples of FIGS. 8 and 9, the design support device 55 is realized by a programming process using the processor 50. However, a part or all of the file registration device 60, the terminal generation device 61, and the terminal linking device 62 may be realized by, for example, a Field Programmable Gate Array (FPGA) or the like.

Details of File Registration Device

Figure 10:
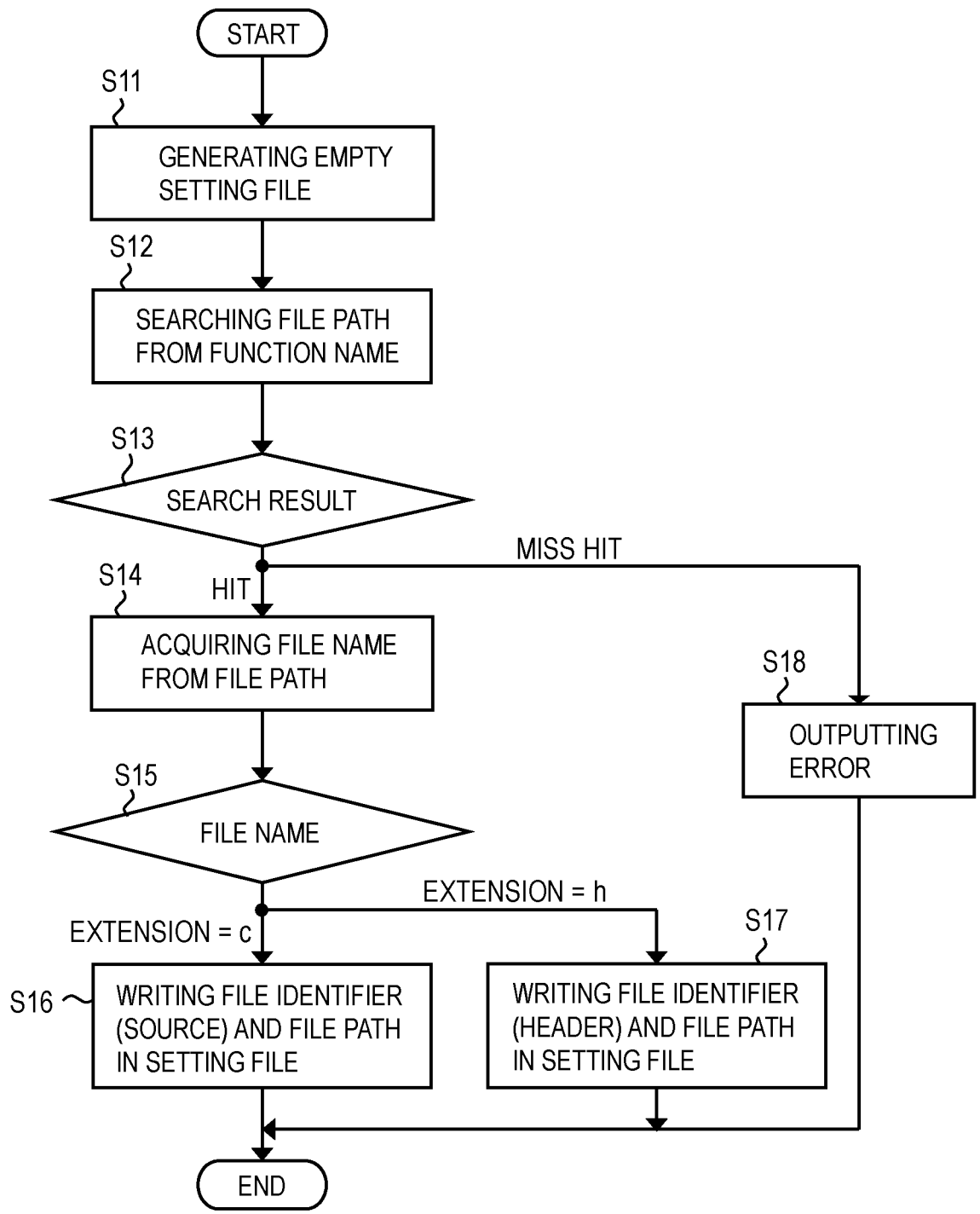
FIG. 10 is a flowchart showing an example of processing of a file registration device in FIG. 9.

FIG. 10 is a flowchart showing an example of processing of the file registration device in FIG. 9. In FIG. 10, in a step S11, the file registration device 60 first generates an empty code registration setting file 35. Subsequently, in a step S12, based on the function name FN input by the user, the file registration device 60 uses the search program 56 of FIG. 8 to search the file path FP of the file in which the function name FN is defined from, for example, the storage device such as the auxiliary storage device 52b.

Next, in a step S13, the file registration device 60 determines a hit or miss hit of the search result of the step S12. In a step S14, if the search result of the step S13 is a hit, the file registration device 60 acquires the extension of the file name included in the file path FP.

Here, when the extension is "c" in a step S15, the file registration device 60 writes, in a step S16, the file identifier FID indicating the source 21, and the file path FP in the code registration setting file 35 generated in the step S11. Meanwhile, when the extension is "h" in the step S15, the file registration device 60 writes, in a step S17, the file identifier FID indicating the header 22 and the file path FP in the code registration setting file 35 generated in step S11.

When the search result in step S13 is a plurality of hits, the file registration device 60 performs the processing of the steps S14 to S17 on the plurality of file paths FP that serve as the search result. In addition, if the search result is a miss hit in the step S13, the file registration device 60 outputs, for example, an error in a step S18.

By providing the file registration device 60 for performing such processing, the correct C code 20, which is a reflection source of the verification target block BKM, can be automatically registered in the code block BKC. That is, it is possible to prevent the user from manually registering an incorrect C code 20 in the code block BKC.

Details of Terminal Generation Device

Figure 11A:
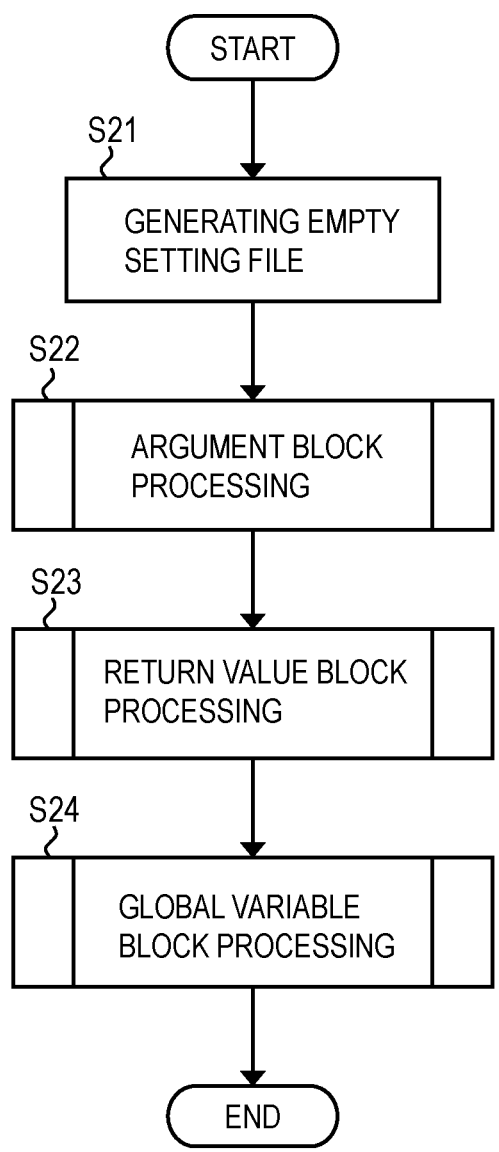
FIG. 11A is a flowchart showing an example of processing of a terminal generation device shown in FIG. 9.

FIG. 11A is a flowchart showing an example of processing of the terminal generation device shown in FIG. 9. In FIG. 11A, in a step 21, the terminal generation device 61 first generates an empty terminal generation setting file 36. Next, the terminal generation device 61 executes argument block processing of a step S22, return value block processing of a step S23, and global variable block processing of step S24, thereby writing predetermined description items in the empty terminal generation setting file 36.

Figure 11B:
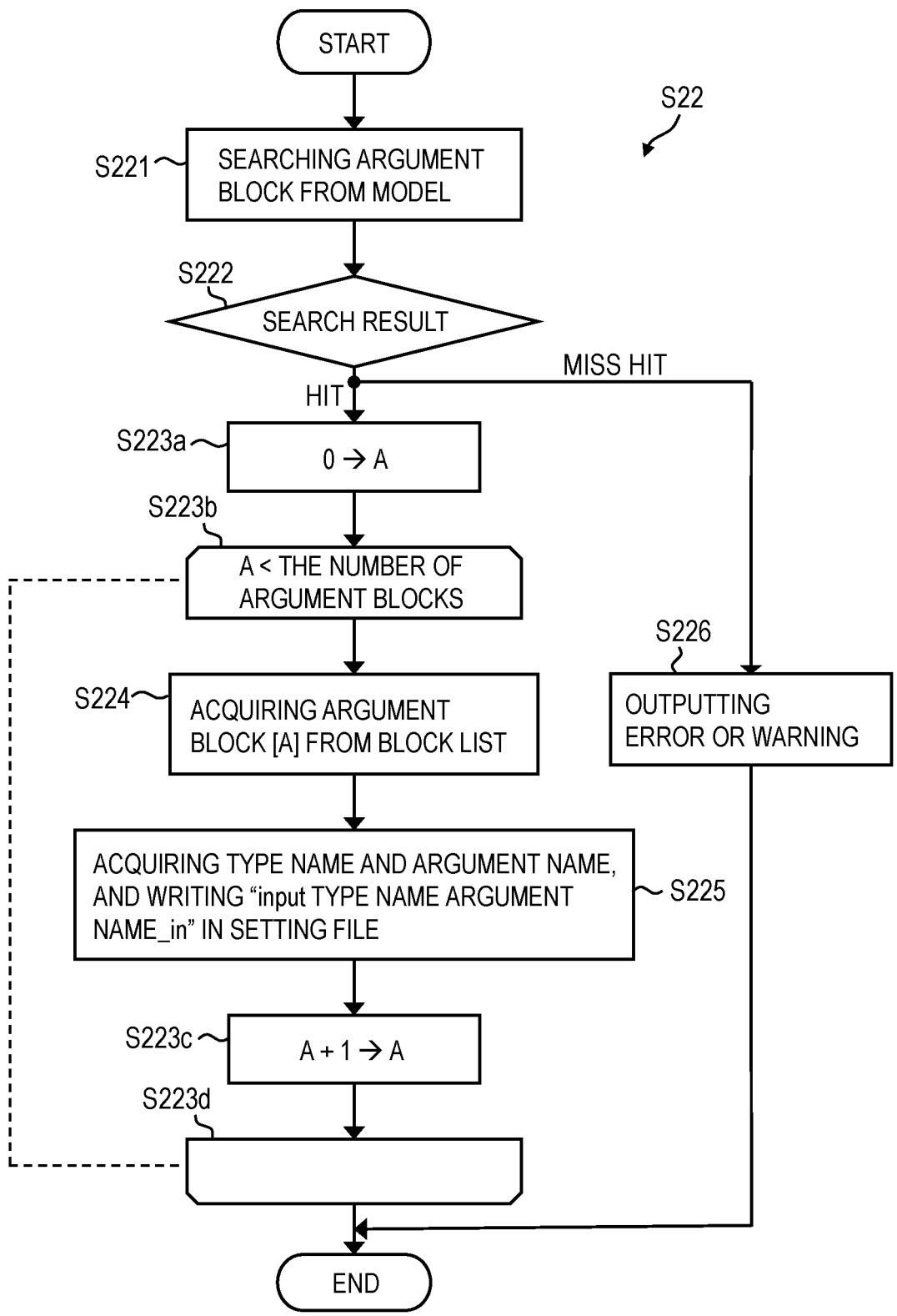
FIG. 11B is a flowchart showing an example of argument block processing of FIG. 11A.

FIG. 11B is a flowchart showing an example of the argument block processing of FIG. 11A. In FIG. 11B, in a step S221, the terminal generation device 61 first reads the verification target block BKM instructed by the user from the storage device, and searches the verification target block BKM for the argument block 45 described in FIG. 6B based on the block type of the terminal block. Then, the terminal generation device 61 generates an argument block list by listing the searched argument blocks 45.

In a step S222, the terminal generation device 61 determines a hit or miss hit of the search result of the step S221. If the search result in the step S222 is a hit, the terminal generation device 61 repeatedly executes processing of steps S224 and S225 by the number of the argument blocks 45 obtained in the step S221 (Refer to steps S223a, S223b, S223c, and S223d). On the other hand, in a step S226, if the search result in the step S222 is a miss hit, the terminal generation device 61 outputs, for example, an error or warning.

In the step S224, the terminal generation device 61 acquires the [A]th argument block 45 from the argument block list generated in the step S221. Next, in the step S225, the terminal generation device 61 acquires the type name TYP and the argument name from the argument blocks 45 acquired in step S224, and writes "input type name argument name_in" in the terminal generation setting file 36 generated in the step S21 of FIG. 11A. Then, the terminal generation device 61 repeats the processing of the steps S224 and S225 while incrementing [A].

As a result, the terminal generation device 61 can write, in the terminal generation setting file 36, an input terminal based on the argument names of the argument blocks 45 searched from the verification target block BKM. As a specific example, in the cases of FIGS. 6A and 6B, the terminal generation device 61 writes "input int a1_in" indicating the input terminal IN in the terminal generation setting file 36 shown in FIG. 6A based on the argument name "a1" of the argument block 45 of FIG. 6B. In addition, the same applies to the argument name "a2" of the argument block 45 of FIG. 6B.

Figure 11C:
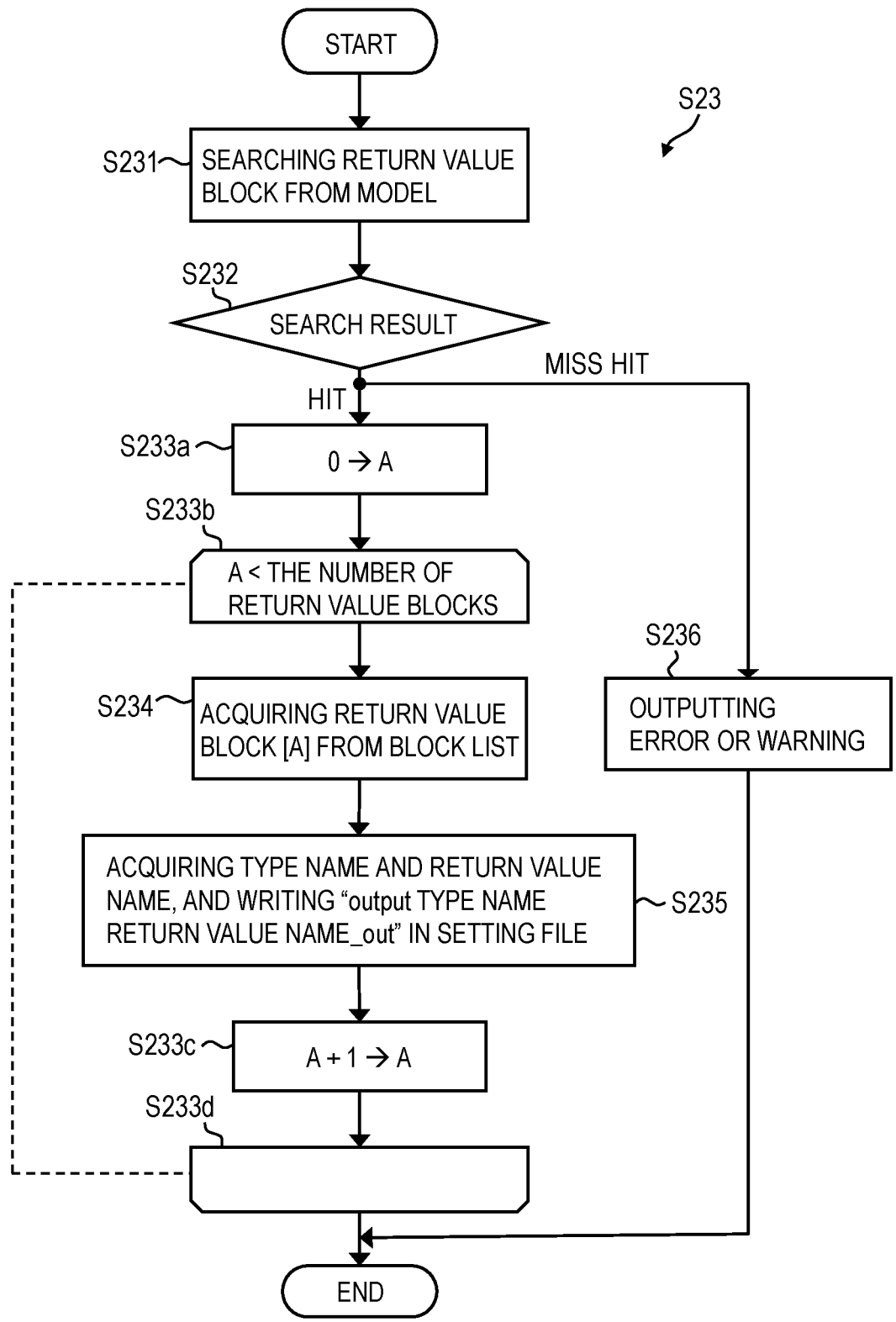
FIG. 11C is a flowchart showing an example of return value block processing of FIG. 11A.

FIG. 11C is a flowchart showing an example of the return value block processing of FIG. 11A. Processing of steps S231, S232, S233a to S233d, and S234 to S236 in FIG. 11C is substantially the same as the processing of the steps S221, S222, S223a to S223d, and S224 to S226 described in FIG. 11B. However, in FIG. 11C, the processing target is the return value block 46 rather than the argument block 45.

Along with this difference, in the step S231, the terminal generation device 61 searches the return value block 46 from the verification target block BKM. In the step S234, the terminal generation device 61 acquires the [A]th return value block 46 from a return value block list. Then, in the step S235, the terminal generation device 61 acquires the type name TYP and the return value name from the return value block 46 acquired in the step S234, and writes "output type name return value name_out" in the terminal generation setting file 36.

As a result, the terminal generation device 61 can write, in the terminal generation setting file 36, the output terminal based on the return value name of the return value block 46 searched from the verification target block BKM. As a specific example, in the cases of FIGS. 6A and 6B, the terminal generation device 61 writes "output int ret_out" indicating the output terminal OT in the terminal generation setting file 36 shown in FIG. 6A based on the return value name "ret" of the return value block 46 of FIG. 6B.

Figure 11D:
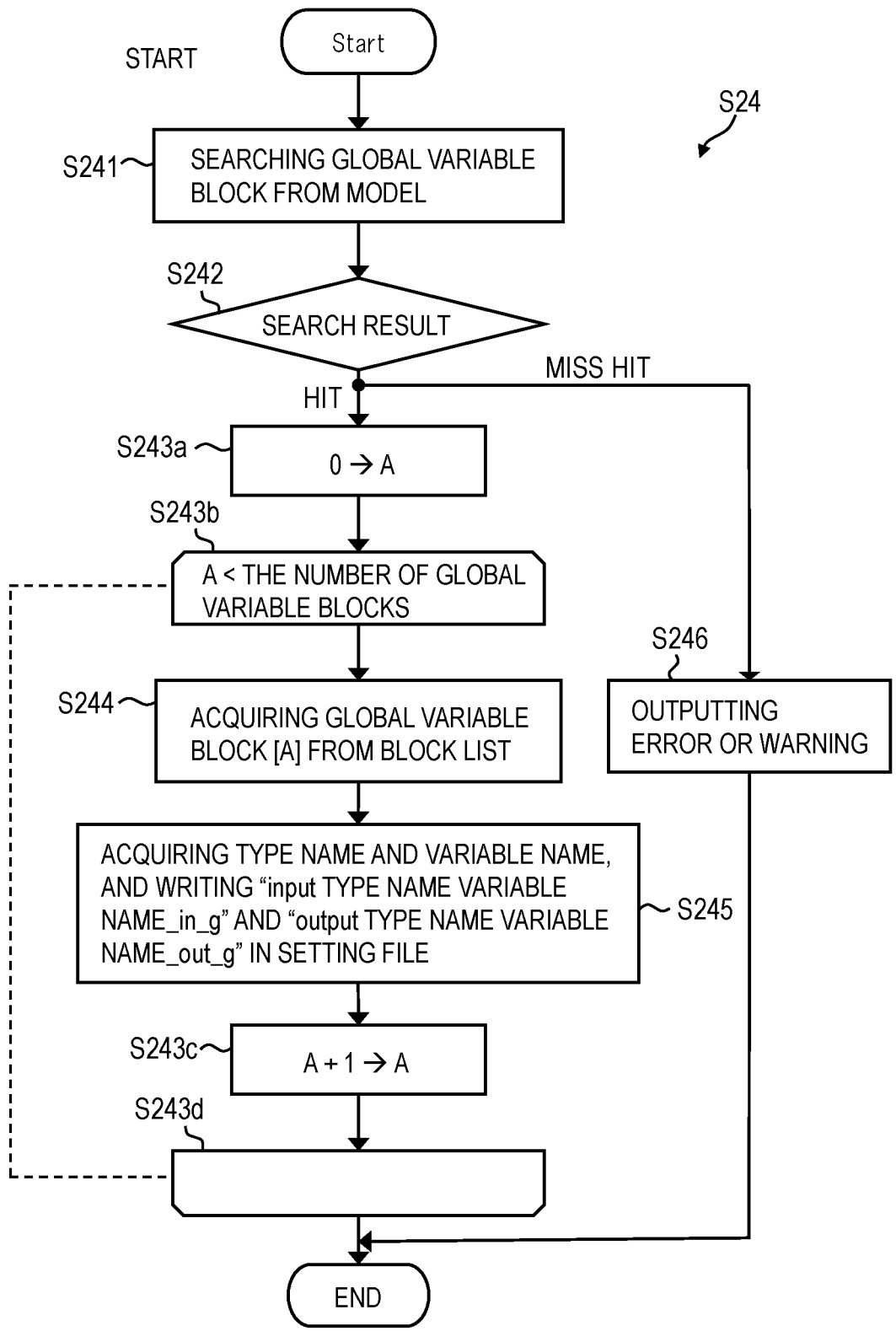
FIG. 11D is a flowchart showing an example of global variable block processing of FIG. 11A.

FIG. 11D is a flowchart showing an example of the global variable block processing of FIG. 11A. Processing of steps S241, S242, S243a to S243d, and S244 to S246 in FIG. 11D is substantially the same as the processing of the steps S221, S222, S223a to S223d, and S224 to S226 described in FIG. 11B. However, in FIG. 11D, the processing target is the global variable block 47 rather than the argument block 45.

Along with this difference, in the step S241, the terminal generation device 61 searches the global variable block 47 from the verification target block BKM. In the step S244, the terminal generation device 61 acquires the [A]th global variable block 47 from a global variable block list. Then, in the step S245, the terminal generation device 61 acquires the type name TYP and the variable name from the global variable block 47 acquired in the step S244, and writes "input type name variable name_in_g" in the terminal generation setting file 36. In addition, the terminal generation device 61 also writes "output type name variable name_out_g" in the terminal generation setting file 36.

As a result, the terminal generation device 61 can write, in the terminal generation setting file 36, the global variable input terminal and the global variable output terminal based on the variable name of the global variable block 47 searched from the verification target block BKM. As a specific example, in the cases of FIGS. 6A and 6B, the terminal generation device 61 writes "input int g_in_g" indicating the global variable input terminal IN in the terminal generation setting file 36 shown in FIG. 6A based on the variable name "g" of the global variable block 47 of FIG. 6B. In addition, the terminal generation device 61 writes "output int g_out_g" indicating the global variable output terminal OT in the terminal generation setting file 36.

By providing the terminal generation device 61 for performing such processing, for example, in FIGS. 6A and 6B, it is possible to match the number of terminals in the code block BKC and the verification target block BKM, further, it is possible to match the terminal names. That is, it is possible to automatically generate a terminal generation file 36 accurately reflecting the terminals of the verification target block BKM. Therefore, it is possible to reduce the workload of the user, and it is possible to prevent a description error that may occur in the case of a manual operation.

Furthermore, since the terminal generation setting file 36 is generated based on the block type of the terminal included in the verification target block BKM rather than the parameter of the C code 20, the processing load of the terminal generation device 61 can be reduced. That is, the C code 20 differs from the verification target block BKM, and a variety of description formats may exist. Therefore, the processing can be simplified by searching the block type of the terminal from the verification target block BKM, rather than searching the parameter from the C code 20.

Details of Terminal Linking Device

Figure 12A:
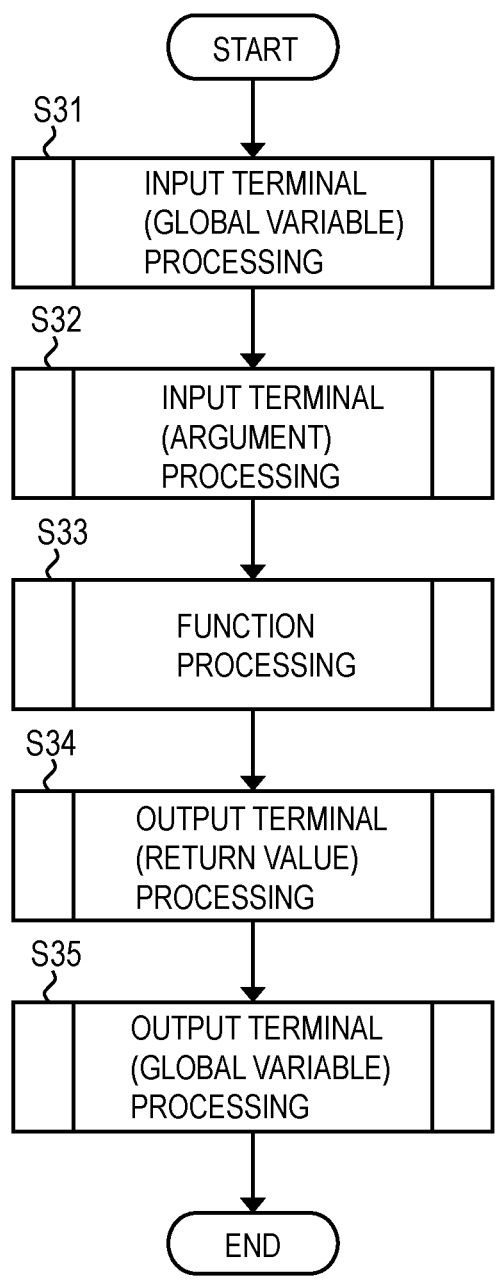
FIG. 12A is a flowchart showing an example of processing of a terminal linking device shown in FIG. 9.

FIG. 12A is a flowchart showing an example of processing of the terminal linking device shown in FIG. 9. In FIG. 12A, the terminal linking device 62 executes input terminal (global variable) processing of a step S31, input terminal (argument) processing of a step S32, functional processing of a step S33, output terminal (return value) processing of a step S34, and output terminal (global variable) processing of a step S35. Through these processing, the terminal linking device 62 generates the terminal linking code 41 to be written in the code block BKC. The terminal linking device 62 may selectively execute the processing of the steps S31 to S35 in accordance with an instruction from the user.

Figure 12B:
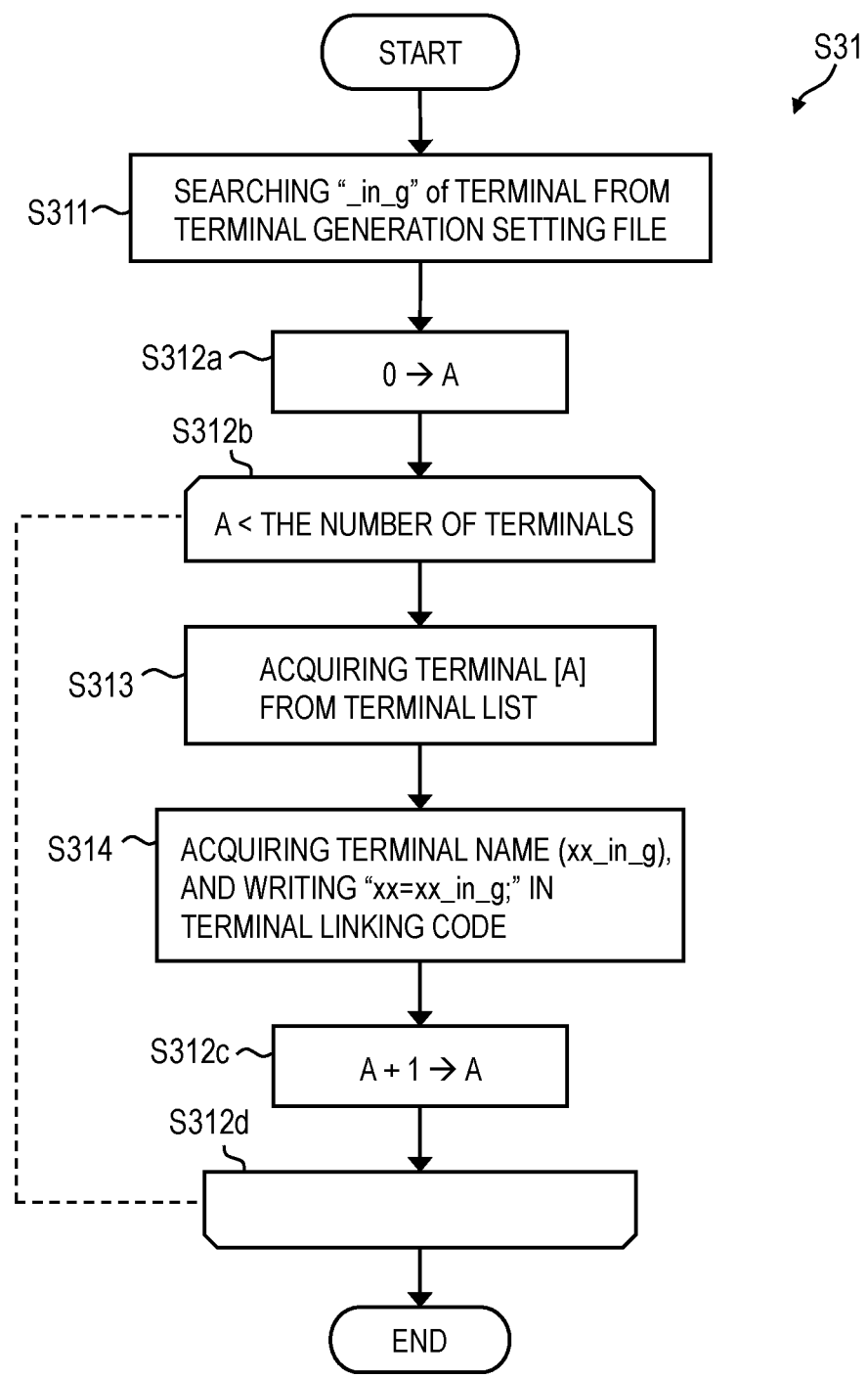
FIG. 12B is a flowchart showing an example of input terminal (global variable) processing in FIG. 12A.

FIG. 12B is a flowchart showing an example of the input terminal (global variable) processing in FIG. 12A. In FIG. 12B, the terminal linking device 62 first searches from the terminal generation setting file 36 generated by the terminal generation device 61 for a terminal whose tail is "_in_g", in a step S311. Then, the terminal linking device 62 generates a terminal list by listing the searched terminals.

Subsequently, the terminal linking device 62 repeatedly executes processing of steps S313 and S314 by the number of terminals obtained in the step S311 (Refer to steps S312a, S312b, S312c, and S312d). In the step S313, the terminal linking device 62 acquires the [A]th terminal from the terminal list generated in the step S311.

Then, in the step S314, the terminal linking device 62 acquires the terminal name PN of the terminal acquired in the step S313. The acquired terminal name PN is in the form of "xx_in_g". Then, the terminal linking device 62 processes the portion "_in_g" included in the terminal name PN, thereby writing "xx=xx_in_g;" in the terminal linking code 41. The terminal linking device 62 repeats the processing of the steps S313 and S314 while incrementing [A].

As a result, the terminal linking device 62 can write, in the terminal linking code 41, the code indicating that the value of the global variable input terminal IN is substituted into the global variable GV, based on the terminal name PN of the global variable input terminal IN. As a specific example, in the cases of FIGS. 6A and 6B, the terminal linking device 62 writes the code 42a in the terminal linking code 41 based on the "g_in_g" which is the terminal name PN of the global variable input terminal IN of the terminal generation setting file 36 of FIG. 6A.

Further, by using such processing, for example, it is possible to prevent the description error 49a in the terminal linking code 41 as shown in FIG. 7. Furthermore, the consistency between the terminals of the verification target block BKM and the parameters of the C code 20 can be verified. As a specific example, in FIG. 6B, it is assumed that the user erroneously sets the variable name of the global variable block 47 serving as the input terminal IN not to "g" but to "g2" as in the case of the description error 49b of FIG. 7.

In this case, "g2_in_g" is written in the terminal generation setting file 36, and "g2=g2_in_g" is written in the terminal linking code 41. In this state, when the code block BKC is compiled by the CAE tool 15a, the compiler of the CAE tool 15a attempts to search the global variable "g2" from the C code 20 of the corresponding FIG. 4. However, a compilation error occurs because the global variable "g2" does not exist in the C code 20.

In this manner, it is possible to verify that the variable name of the global variable block 47 created in the verification target block BKM matches the variable name of the global variable in the C code 20. In other words, it is possible to verify that the variable name of the terminal block of the verification target block BKM is created by accurately reflecting the name of the parameter of the C code 20.

Figure 12C:
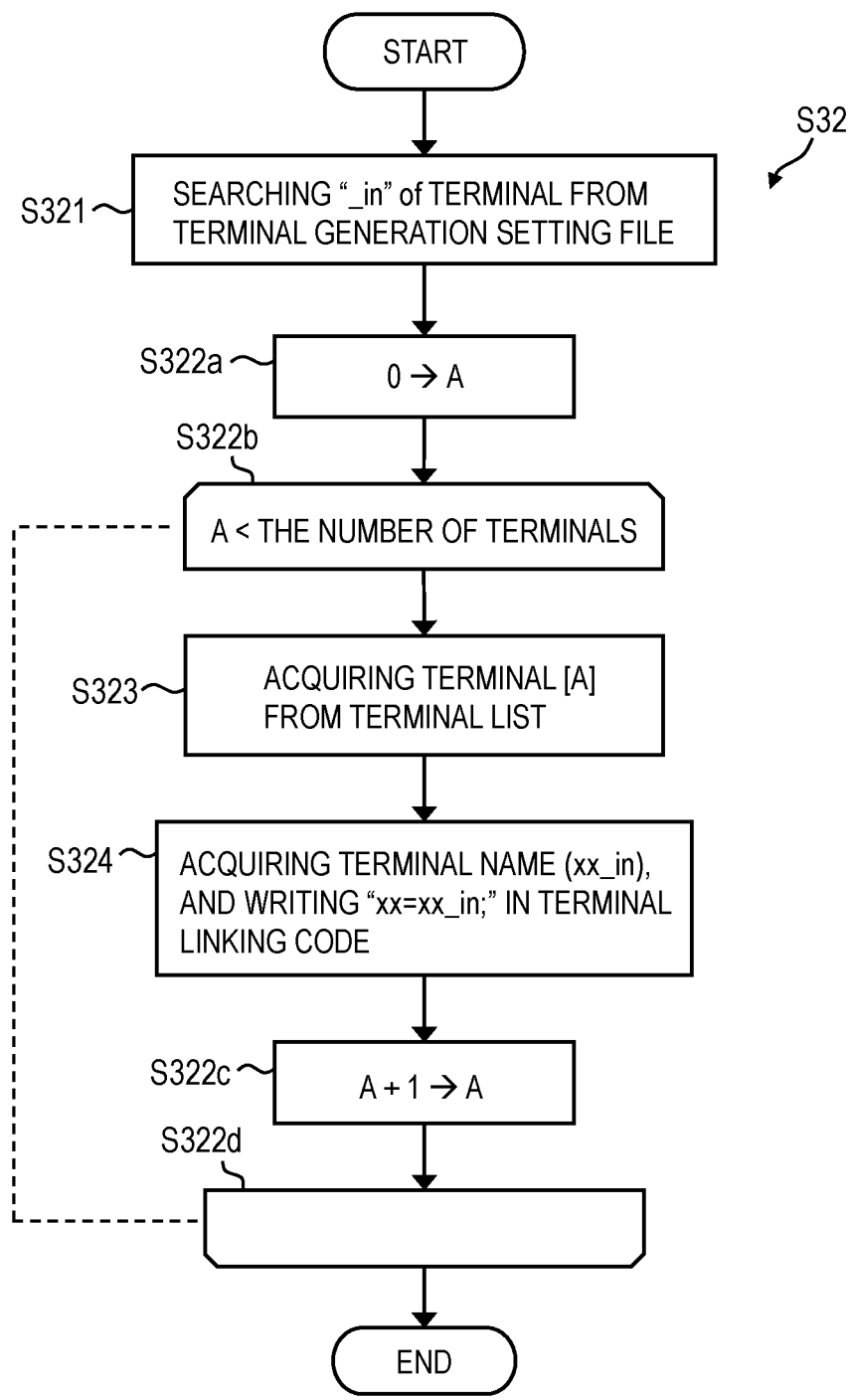
FIG. 12C is a flowchart showing an example of input terminal (argument) processing in FIG. 12A.

FIG. 12C is a flowchart showing an example of the input terminal (argument) processing in FIG. 12A. Processing of steps S321, S322a to S322d, S323, and S324 in FIG. 12C is substantially the same as the processing of the steps S311, S312a to S312d, S313, and S314 described in FIG. 12B. However, in FIG. 12C, the processing target is the terminal of "_in" rather than the terminal of "_in_g".

Along with this difference, in the step S321, the terminal linking device 62 searches the terminal generation setting file 36 for a terminal whose tail is "_in". Further, in the step S323, the terminal linking device 62 acquires the [A]th terminal from the terminal list. Then, in the step S324, the terminal linking device 62 acquires the terminal name PN of the terminal acquired in the step S323. The acquired terminal name PN is in the form of "xx_in". Then, the terminal linking device 62 writes "xx=xx_in;" in the terminal linking code 41 by processing the portion "_in" included in the terminal name PN.

Figure 12D:
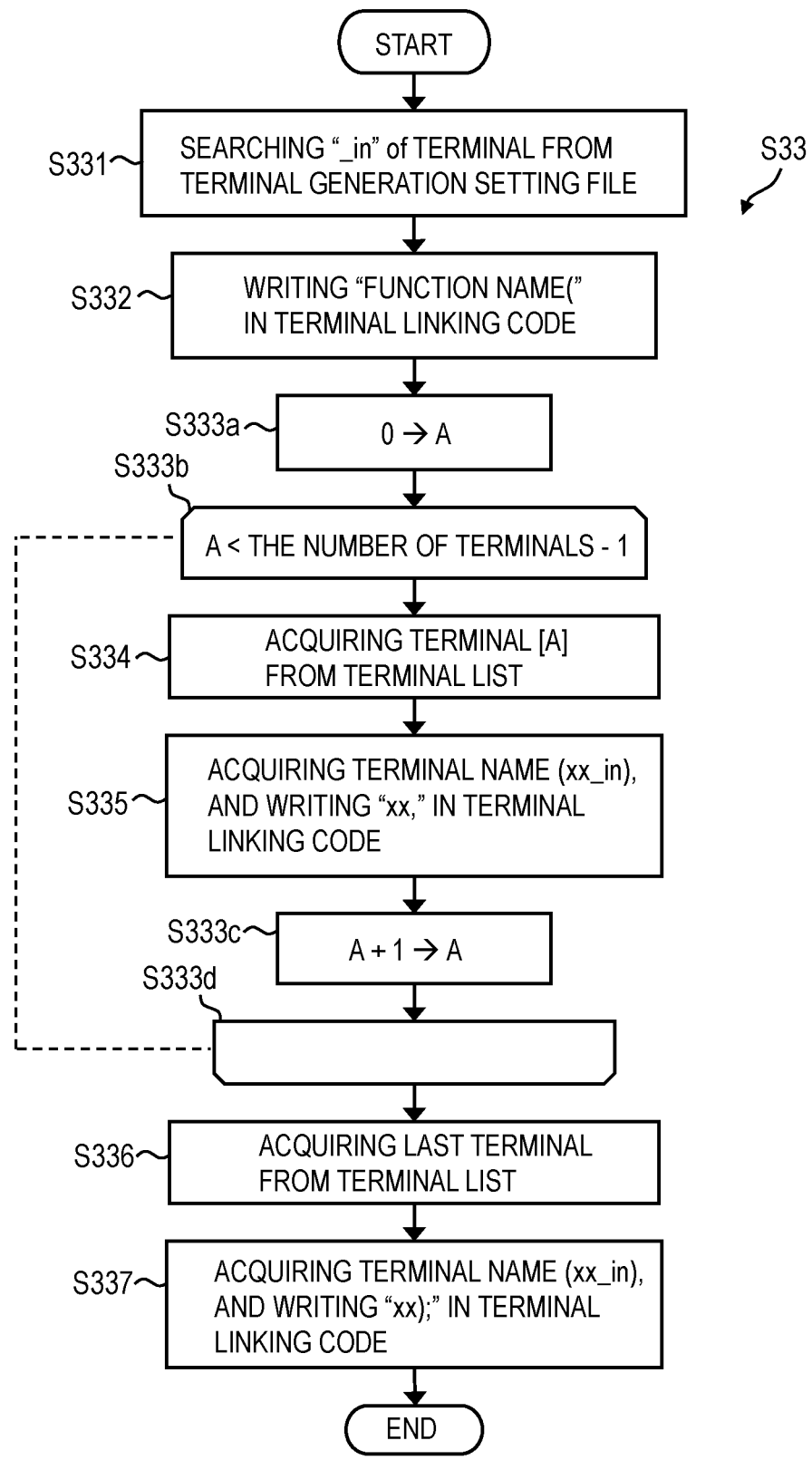
FIG. 12D is a flowchart showing an example of function processing in FIG. 12A.

FIG. 12D is a flowchart showing an example of the function processing in FIG. 12A. In FIG. 12D, the terminal linking device first searches the terminal generation setting file 36 generated by the terminal generation device 61 for a terminal whose tail is "_in", in a step S331. Then, the terminal linking device 62 generates a terminal list by listing the searched terminals.

Next, in a S332, the terminal linking device 62 writes the "function name (" in the terminal linking code 41 based on the function name FN input by the user. Then, the terminal linking device 62 repeatedly executes processing of steps S334 and S335 by the number obtained by subtracting 1 from the number of terminals obtained in the step S331 (Refer to steps S333a, S333b, S333c, and S333d). In the step S334, the terminal linking device 62 acquires the [A]th terminal from the terminal list generated in the step S331.

Subsequently, in the step S335, the terminal linking device 62 acquires the terminal name PN of the terminal acquired in the step S334. The acquired terminal name PN is in the form of "xx_in". Then, by omitting the portion of "_in" included in the terminal name PN, the terminal linking device 62 writes "xx," as a continuation of the "function name (" written in the S332 described above. The terminal linking device 62 repeats the processing of the steps S334 and S335 from the end of the terminal list to the first terminal of the terminal list while incrementing W. For the second and subsequent terminals, "xx," is written as a continuation of the "function name (xx," written in the step S335.

Thereafter, in a step S336, the terminal linking device 62 acquires the last terminal from the terminal list generated in the step S331. Subsequently, in a step S337, the terminal linking device 62 acquires the terminal name PN of the terminal acquired in the step S336, and by omitting the portion of "_in" included in the terminal name PN, writes "xx);" as a continuation of the "function name (xx, . . . ," written in the above-described step S335.

As a result, the terminal linking device 62 can write, in the terminal linking code 41, a part of the code indicating that the value of the input terminal IN is substituted into the argument of the function represented by the function names FN, based on the terminal generation setting file 36 and the function name FN input by the user. As a specific example, in the cases of FIGS. 6A and 6B, the terminal linking device 62 writes the right side of the code 42*b* in the terminal linking code 41 based on the "a1_in" and "a2_in" which are the terminal names PN of the input terminal IN of the terminal generation setting file 36 of FIG. 6A and the "funcA" which is the input function name FN.

By using such processing, it is possible to verify that the number of argument blocks 45 created in the verification target block BKM is correct. As a specific example, it is assumed that the user sets the number of argument blocks 45 in the verification target block BKM to 1 or 3 instead of 2. In this instance, "funcA(xx);" or "funcA(xx,xx,xx);" is written in the terminal linking cord 41. In this situation, when the code block BKC is compiled by the CAE tool 15*a*, the compiler generates a compilation error because there are two arguments of "funcA" in the C code 20 of FIG. 4.

Figure 12E:
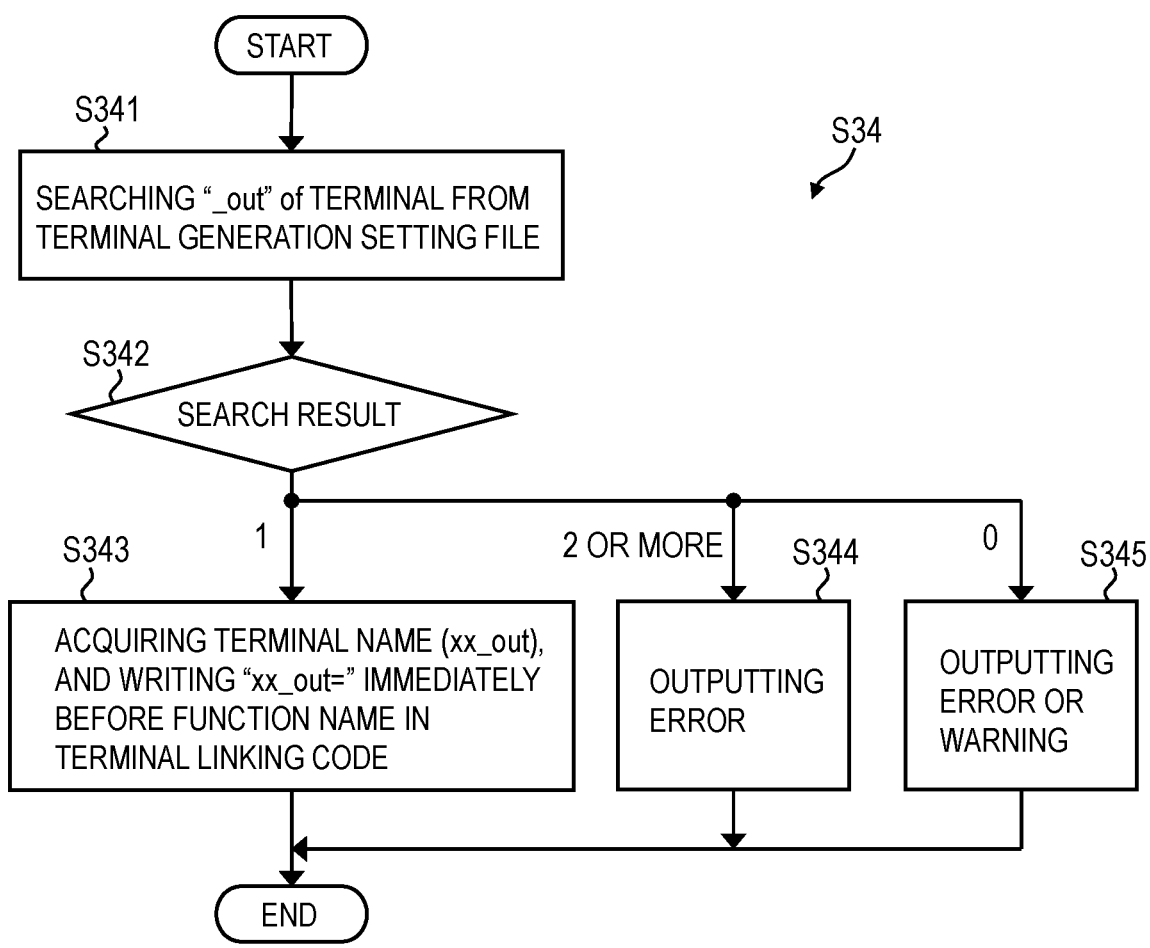
FIG. 12E is a flowchart showing an example of output terminal (return value) processing in FIG. 12A.

FIG. 12E is a flowchart showing an example of the output terminal (return value) processing in FIG. 12A. In FIG. 12E, the terminal linking device 62 first searches the terminal generation setting file 36 generated by the terminal generation device 61 for a terminal whose tail is "_out", in a step S341. Subsequently, in a step S342, the terminal linking device 62 determines the number of terminals searched in the step S341.

If the number of terminals in the step S342 is one, the terminal linking device 62 acquires the terminal name PN of the terminal. The acquired terminal name PN is in the form of "xx_out". Then, in a step S343, the terminal linking device 62 writes "xx_out=" immediately before the function name FN written in the terminal linking code 41 by the processing of FIG. 12D. On the other hand, in a step S344, if the number of terminals in the step S342 is two or more, the terminal linking device 62 outputs an error. Also, in a step S345, if the number of terminals in the step S342 is 0, the terminal linking device 62 outputs, for example, an error or warning.

As a result, the terminal linking device 62 can write, in the terminal linking code 41, a part of the code indicating that the return value of the function is substituted into the value of the output terminal OT based on the terminal generation setting file 36. As a specific example, in the cases of FIGS. 6A and 6B, the terminal linking device 62 writes the left side of the code 42*b* in the terminal linking code 41 based on the "ret_out" which is the terminal name PN of the output terminal OT of the terminal generation setting file 36 of FIG. 6A.

By using such processing, the terminal linking device 62 can output an error when the number of output terminals OT written in the terminal generation setting file 36 is not one. That is, since the number of return values of the function in the C code 20 is usually 1, the number of return value blocks 46 created in the verification target block BKM should also be 1. On this assumption, it becomes possible to verify that the number of output terminals OT in the verification target block BKM, specifically, the number of return value blocks 46 is correct.

Figure 12F:
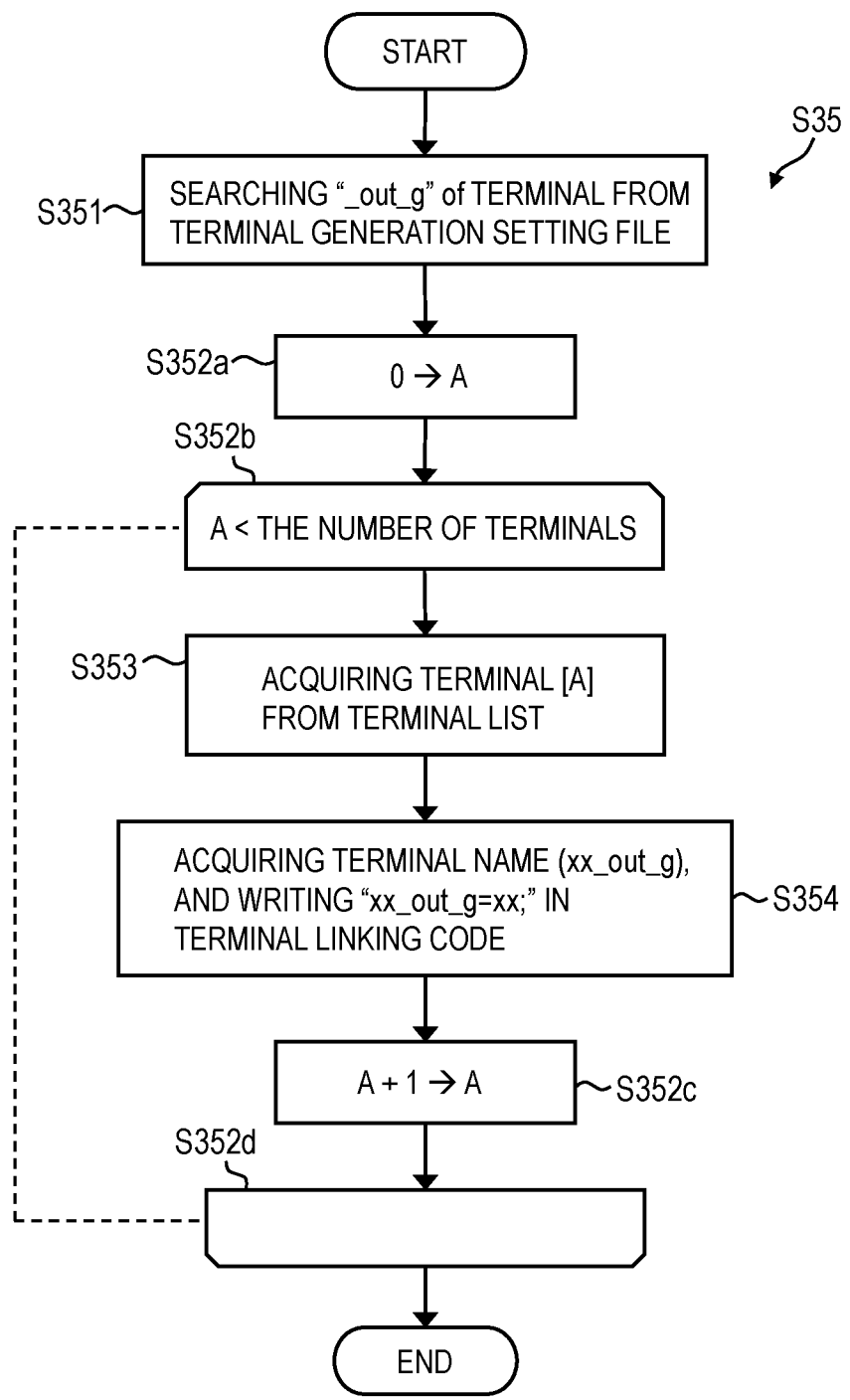
FIG. 12F is a flowchart showing an example of output terminal (global variable) processing in FIG. 12A.

FIG. 12F is a flowchart showing an example of the output terminal (global variable) processing in FIG. 12A. Processing of steps S351, S352*a* to S352*d*, S353, and S354 in FIG. 12F is substantially the same as the processing of the steps S311, S312*a* to S312*d*, S313, and S314 described in FIG. 12B. However, in FIG. 12F, the processing target is the terminal of "_out_g" rather than the terminal of "_in_g".

Along with this difference, in a step S351, the terminal linking device 62 searches the terminal generation setting file 36 for a terminal whose tail is "_out_g". Further, in a step S353, the terminal linking device 62 acquires the [A]th terminal from the terminal list. Then, in a step S354, the terminal linking device 62 acquires the terminal name PN of the terminal acquired in the step S353. The acquired terminal name PN is the form of "xx_out_g". The terminal association device 62 writes "xx_out_g=xx;" in the terminal linking code 41 by processing the portion of "_out_g" included in the terminal name PN.

Thus, the terminal linking device 62 can write, in the terminal linking code 41, the code indicating that the global variable GV is substituted into the value of the global variable output terminal OT based on the terminal name PN of the global variable output terminal OT. As a specific example, in the cases of FIGS. 6A and 6B, the terminal linking device 62 writes the code 42*c* in the terminal linking code 41 based on the "g_out_g" which is the terminal name PN of the global variable output terminal OT of the terminal generation setting file 36 of FIG. 6A.

Further, by using such processing, as in the case of FIG. 12B, it is possible to prevent a description error in the terminal linking code 41. Further, as in the case of FIG. 12B, it becomes possible to verify the consistency between the terminals of the verification target block BKM and the parameters of the C code 20. In other words, it is possible to verify that the variable name of the terminal block of the verification target block BKM is created by accurately reflecting the name of the parameter of the C code 20. As a specific example, it is possible to detect the description error 49*b* in FIG. 7.

Main Effects of Embodiments

As described above, by using the method of the embodiment, it is possible to reduce a workload such as a user's labor and work time. In addition, it is possible to prevent a description error associated with the generation of the code registration setting file 35, the terminal generation setting file 36, and the terminal linking code 41. Further, it becomes possible to verify the consistency between the terminals of the verification target block BKM and the argument ARG, the return value RV, the global variable GV, and the like which are the parameters of the C code 20. As a result, the design can be facilitated, and the design period can be shortened.

Here, it is assumed that the method of the embodiment is applied to a system model created by a device manufacturer. However, the method of the embodiment can be similarly applied to models created by higher-level system manufacturers such as Electronic Control Unit (ECU) manufacturers and automobile manufacturers, for example. However, in general, since the model created by the device manufacturer has a larger number of terminals than the model or the like created by the higher-level system manufacturer, the generation of the code block BKC can be more complicated. In this respect, it is useful to apply the method of the embodiment to the system model created by the device manufacturer.

Although the invention made by the present inventors has been specifically described based on the embodiment, the present invention is not limited to the embodiment described above, and it is needless to say that various modifications can be made without departing from the gist thereof.

What is claimed is:

1. A design support apparatus for supporting a generation of a code block to verify a model created by referencing a source code, the model operating in a model execution environment in a model-based development, the source code being registered in the code block, the design support apparatus comprising:
  a processor; and
  a storage device configured to store the source code and the model,
  wherein the processor is configured to:
    generate a terminal generation setting file in which a terminal of the code block is written, by searching a terminal block included in the model read from the storage device and defining the terminal of the code block based on the terminal block obtained from a search result of the terminal block;
    write, in the code block, a terminal linking code indicating a correspondence relationship between the terminal written in the terminal generation setting file and the source code; and
    compile, using the terminal generation setting file, the code block in which the terminal linking code is written into a format executable in the model execution environment,
  wherein the processor is configured to write, in the terminal generation setting file, an input terminal based on an argument name of an argument block searched from the model, an output terminal based on a return value name of a return value block searched from the model, a global variable input terminal based on a variable name of a global variable block searched from the model, and a global variable output terminal based on the variable name of the global variable block searched from the model, and
  wherein the processor is configured to:
    write, in the terminal linking code, a first code indicating that a value of the input terminal is substituted into an argument of a function represented by a function name and that a return value of the function is substituted into a value of the output terminal, based on the terminal generation setting file and the function name input by a user;
    write, in the terminal linking code, a second code indicating that a value of the global variable input terminal is substituted into a global variable, based on a terminal name of the global variable input terminal; and
    write, in the terminal linking code, a third code indicating that the global variable is substituted into a value of the global variable output terminal, based on a terminal name of the global variable output terminal.

2. The design support apparatus according to claim 1, wherein the processor is configured to:
  search, based on a function name entered by a user, a file defining a function of the function name, and generate a code registration setting file in which a file path obtained from a search result of the file defining the function of the function name is written; and
  compile, using the terminal generation setting file and the code registration setting file, the code block into the format executable in the model execution environment.

3. The design support apparatus according to claim 1, wherein the processor is configured to:
  determine whether a number of the output terminal written in the terminal generation setting file is one; and
  output an error if the number of the output terminal is not one.

4. The design support apparatus according to claim 1, wherein the processor is configured to:
  compile the code block and the model into the format executable in the model execution environment; and
  verify an identity between the code block and the model by providing a common input to the code block and the model in the model execution environment.

5. A design support apparatus for supporting a generation of a code block to verify a model created by referencing a source code, the model operating in a model execution environment in a model-based development, the source code being registered in the code block, the design support apparatus comprising:
  a storage device configured to store the source code and the model;
  a terminal generation device configured to generate a terminal generation setting file in which a terminal of the code block is written, by searching a terminal block included in the model and defining the terminal of the code block based on the terminal block obtained from a search result of the terminal block; and
  a terminal linking device configured to write, in the code block, a terminal linking code indicating a correspondence relationship between the terminal written in the terminal generation setting file and the source code,
  wherein the code block in which the terminal linking code is written is compiled into a format executable in the model execution environment using the terminal generation setting file,
  wherein the terminal generation device is configured to write, in the terminal generation setting file, an input terminal based on an argument name of an argument block searched from the model, an output terminal based on a return value name of a return value block searched from the model, a global variable input terminal based on a variable name of a global variable block searched from the model, and a global variable output terminal based on the variable name of the global variable block searched from the model, and
  wherein the terminal linking device is configured to:
    write, in the terminal linking code, a first code indicating that a value of the input terminal is substituted into an argument of a function represented by a function name and that a return value of the function is substituted into a value of the output terminal, based on the terminal generation setting file and the function name input by a user;
    write, in the terminal linking code, a second code indicating that a value of the global variable input terminal is substituted into a global variable, based on a terminal name of the global variable input terminal; and
    write, in the terminal linking code, a third code indicating that the global variable is substituted into a value of the global variable output terminal, based on a terminal name of the global variable output terminal.

6. The design support apparatus according to claim 5, further comprising a file registration device configured to:
  search, based on a function name entered by a user, a file defining a function of the function name; and
  generate a code registration setting file in which a file path obtained from a search result of the file defining the function of the function name is written,
  wherein the code block is compiled into the format executable in the model execution environment using the terminal generation setting file and the code registration setting file.

7. The design support apparatus according to claim 6, wherein the terminal linking device is configured to:
  determine whether a number of the output terminal written in the terminal generation setting file is one; and
  output an error if the number of the output terminal is not one.

8. The design support apparatus according to claim 5, wherein the design support apparatus is configured to:
  compile the code block and the model into the format executable in the model execution environment; and
  verify an identity between the code block and the model by providing a common input to the code block and the model in the model execution environment.

9. A design support method for supporting a generation of a code block to verify a model created by referencing a source code, the model operating in a model execution environment in a model-based development, the source code being registered in the code block, the design support method comprising:
  storing the source code and the model in a storage device;
  generating a terminal generation setting file in which a terminal of the code block is written, by searching a terminal block included in the model read from the storage device and defining the terminal of the code block based on the terminal block obtained from a search result of the terminal block;
  writing, in the code block, a terminal linking code indicating a correspondence relationship between the terminal written in the terminal generation setting file and the source code;
  compiling, using the terminal generation setting file, the code block in which the terminal linking code is written into a format executable in the model execution environment;
  writing, in the terminal generation setting file, an input terminal based on an argument name of an argument block searched from the model, an output terminal based on a return value name of a return value block searched from the model, a global variable input terminal based on a variable name of a global variable block searched from the model, and a global variable output terminal based on the variable name of the global variable block searched from the model;
  writing, in the terminal linking code, a first code indicating that a value of the input terminal is substituted into an argument of a function represented by a function name and that a return value of the function is substituted into a value of the output terminal, based on the terminal generation setting file and the function name input by a user;
  writing, in the terminal linking code, a second code indicating that a value of the global variable input terminal is substituted into a global variable, based on a terminal name of the global variable input terminal; and
  writing, in the terminal linking code, a third code indicating that the global variable is substituted into a value of the global variable output terminal, based on a terminal name of the global variable output terminal.

10. The design support method according to claim 9, further comprising:
  searching, based on a function name entered by a user, a file defining a function of the function name;
  generating a code registration setting file in which a file path obtained from a search result of the file defining the function of the function name is written; and
  compiling, using the terminal generation setting file and the code registration setting file, the code block into the format executable in the model execution environment.

11. The design support method according to claim 9, further comprising:
  compiling the code block and the model into the format executable in the model execution environment; and
  verifying an identity between the code block and the model by providing a common input to the code block and the model in the model execution environment.

* * * * *